US007426551B1

(12) United States Patent
Benzinger et al.

(10) Patent No.: US 7,426,551 B1
(45) Date of Patent: Sep. 16, 2008

(54) SYSTEM, METHOD AND COMPUTER PROGRAM PRODUCT FOR DYNAMIC SYSTEM ADAPTATION USING CONTRACTS

(75) Inventors: Lee Benzinger, San Jose, CA (US); Richard J. Feiertag, Mountain View, CA (US); Jaisook Rho, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 1115 days.

(21) Appl. No.: 09/586,550

(22) Filed: May 31, 2000

(51) Int. Cl.
*G06F 15/173* (2006.01)
(52) U.S. Cl. .................. 709/223; 709/224; 709/226
(58) Field of Classification Search ............ 705/37, 705/7, 8, 500, 28, 35, 59; 709/200, 201, 709/223–226; 706/10, 14, 25
See application file for complete search history.

(56) References Cited

U.S. PATENT DOCUMENTS

| 5,235,673 | A | * | 8/1993 | Austvold et al. ............... 706/44 |
| 5,325,525 | A | * | 6/1994 | Shan et al. .................. 709/104 |
| 5,442,730 | A | * | 8/1995 | Bigus .......................... 706/19 |
| 5,745,652 | A | | 4/1998 | Bigus .......................... 395/22 |
| 5,930,357 | A | * | 7/1999 | Fukui .......................... 705/59 |
| 6,009,480 | A | | 12/1999 | Pleso ........................... 710/8 |
| 6,092,047 | A | * | 7/2000 | Hyman et al. .................. 705/4 |
| 6,141,653 | A | * | 10/2000 | Conklin et al. ............... 705/80 |
| 6,144,943 | A | * | 11/2000 | Minder ........................ 705/11 |
| 6,148,290 | A | * | 11/2000 | Dan et al. ..................... 705/1 |
| 6,154,731 | A | * | 11/2000 | Monks et al. ................ 705/35 |
| 6,154,778 | A | * | 11/2000 | Koistinen et al. .......... 709/228 |
| 6,167,378 | A | * | 12/2000 | Webber, Jr. .................... 705/8 |
| 6,182,055 | B1 | * | 1/2001 | Kase et al. ................... 706/10 |
| 6,205,484 | B1 | * | 3/2001 | Eriksson ..................... 709/229 |
| 6,363,053 | B1 | * | 3/2002 | Schuster et al. ............. 370/230 |
| 6,490,252 | B1 | * | 12/2002 | Riggan et al. ............... 370/237 |
| 6,553,568 | B1 | * | 4/2003 | Fijolek et al. ............... 725/111 |
| 6,691,148 | B1 | * | 2/2004 | Zinky et al. ................. 709/201 |
| 6,701,342 | B1 | * | 3/2004 | Bartz et al. ................. 709/200 |
| 6,857,020 | B1 | * | 2/2005 | Chaar et al. ................. 709/226 |

(Continued)

FOREIGN PATENT DOCUMENTS

JP 06098018 A 9/1992

(Continued)

OTHER PUBLICATIONS

Peticolas et al., "IDIAN Protocol Design" Version 1, Draft 0.91, p. 1-25, Mar. 14, 2000.

(Continued)

*Primary Examiner*—Saleh Najjar
*Assistant Examiner*—Faruk Hamza
(74) *Attorney, Agent, or Firm*—Zilka-Kotab, PC; Christopher J. Hamaty

(57) ABSTRACT

A system, method and computer program product are provided for dynamic adaptation of a system in accordance with a contract with criteria associated therewith. During operation, an interaction between a plurality of components of a system is governed utilizing the criteria of the contract. Further, it is determined whether the interaction between the components of the system meets the criteria of the contract. Upon the criteria of the contract not being met, the interaction between the components of the system is adapted to conform to the criteria.

24 Claims, 6 Drawing Sheets

U.S. PATENT DOCUMENTS

| | | |
|---|---|---|
| 6,925,493 B1 * | 8/2005 | Barkan et al. ............... 709/223 |
| 6,996,061 B2 * | 2/2006 | Yang et al. .................. 370/233 |
| 2002/0082893 A1 * | 6/2002 | Barts et al. ..................... 705/8 |

FOREIGN PATENT DOCUMENTS

| | | |
|---|---|---|
| WO | WO99/67931 | 12/1999 |

OTHER PUBLICATIONS

Stuart Staniford-Chen, "Gido Filtering Requirements and Design" Draft 000302.1, p. 1-19.

Freiertag et al., "Intrusion Detection Inter-Component Adaptive Negotiation," Jan. 13, 2000.

\* cited by examiner

SYSTEM, METHOD AND COMPUTER PROGRAM PRODUCT FOR DYNAMIC SYSTEM ADAPTATION USING CONTRACTS

GOVERNMENT LICENSE RIGHTS

The present invention was made with Government support under contract #F30602-97-C-0187 awarded by USAF, AFMC, Rome Laboratory, Directorate of Contracting/PKRZ, 26 Electronic Parkway, Rome, N.Y. 13441-4514. The Government has certain rights in the invention.

FIELD OF THE INVENTION

The present invention relates to networks, and more particularly to dynamically adapting network operation.

BACKGROUND OF THE INVENTION

Systems are very dynamic in that users of the system and devices attached thereto often change on a regular basis. Further, software executed on the system often gets modified and/or updated, and loads on the system periodically fluctuate. There is thus a well established problem of adapting to the ever changing needs of a system.

System adaptation may be required for a number of reasons, both innocent and ill-willed. For example, adaptation may be necessary due to a system being under attack by a hacker, changing system policy, fluctuating system resource utilization, varying availability of different system resources, and/or changing system performance constraints. Preferably, the approach to adaptation is automated as much as possible so as to effect fluid operation as the system adapts to changing conditions.

In some cases, such automation is handled by algorithms used for scheduling the adaptation of various computer resources. Most resource scheduling algorithms are heuristic, i.e. they are based on rules of thumb. This technique generally works well, but often performs poorly when conditions get out of an expected range, or when the system changes unexpectedly. Unfortunately, modern systems change quite often. For example, in a computer network, a set of computer systems communicate with each other via a high speed connection, and the makeup of the system may be in a constant state of flux, as individual computer systems are connected to and disconnected from the network system, and interoperate in various fashions.

In addition to the changes in the computer system configuration, there is also the issue of a constantly changing system workload. The system workload is the combination of all of the work which various components of the system are processing. This system workload changes periodically with the time of day, day of week, and even the time of year, and may also change permanently over time. It is extremely difficult to derive a set of rules or heuristics for resource allocation which anticipates all of these variations in operating conditions.

Changes in a system are thus unpredictable and may occur unexpectedly in real-time. In order to effectively initiate and achieve adaptation, human intervention is often required. As the system changes, a human operator is often relied upon to assess the status of the system, and implement various algorithms or the like for adapting the system to meet the needs of the various components thereof. Unfortunately, this is very cumbersome and subject to error, resulting in a failure to meet the requirements of the various components of the system or system requirements for performance, resource utilization, service availability or security. There is thus a need for a more dynamic, automated method of system adaptation.

DISCLOSURE OF THE INVENTION

A system, method and computer program product are provided for dynamic adaptation of a system in accordance with a contract with criteria associated therewith. During operation, an interaction between a plurality of components of a system is governed utilizing the criteria of the contract. Further, it is determined whether the interaction between the components of the system meets the criteria of the contract. Upon the criteria of the contract not being met, the interaction between the components of the system is adapted to conform to the criteria.

In a preferred embodiment, the interaction between the components of the system is adapted by adjusting the contract. As an option, the contract may be adjusted using numerous methods. For example, such methods may include deactivation of the contract, modification of the contract, deletion of the contract, and/or activation of a different contract.

In another preferred embodiment, the criteria of the contract may include cost model criteria. Such cost model criteria may be based on resource utilization, performance, service provisioning, etc. Further, the interaction that is governed and adapted among the components may be security-related interaction, performance-related interaction, and/or interaction relative to any other aspect of systems that affects the cost model criteria.

DESCRIPTION OF THE PREFERRED EMBODIMENTS

A dynamic, automated method is provided for adapting an interaction between various components of a system in order to continuously meet system and component requirements in real-time or near real-time. In order to accomplish this, the interaction between components is governed by contracts. These contracts utilize criteria, e.g. cost criteria, to determine that the component interaction meets the contract. During operation, the interaction between the components of the system is automatically adapted to meet the criteria of the contracts.

Figure 1:
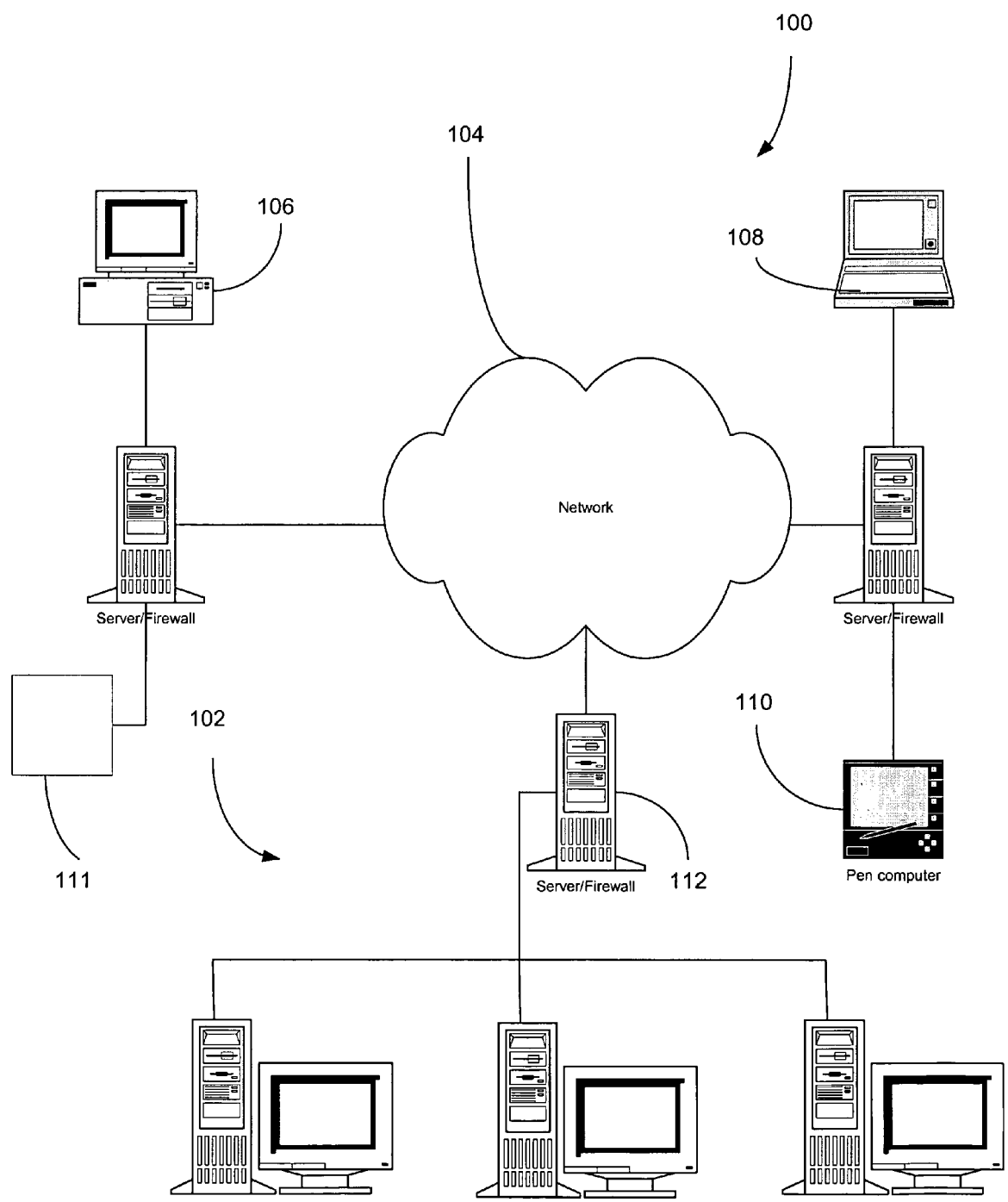
FIG. 1 shows an exemplary system with a plurality of components in accordance with a preferred embodiment.

FIG. 1 illustrates an exemplary system 100 with a plurality of components 102 in accordance with a preferred embodiment. As shown, such components include a network 104 which take any form including, but not limited to a local area network, a wide area network such as the Internet, etc. Coupled to the network 104 is a plurality of computers which may take the form of desktop computers 106, lap-top computers 108, hand-held computers 110, or any other type of computing hardware/software 111. As an option, the various computers may be connected to the network 104 by way of a server 112 which may be equipped with a firewall for security purposes. It should be noted that any other type of hardware or software may be included in the system and be considered a component 102 thereof.

Figure 2:
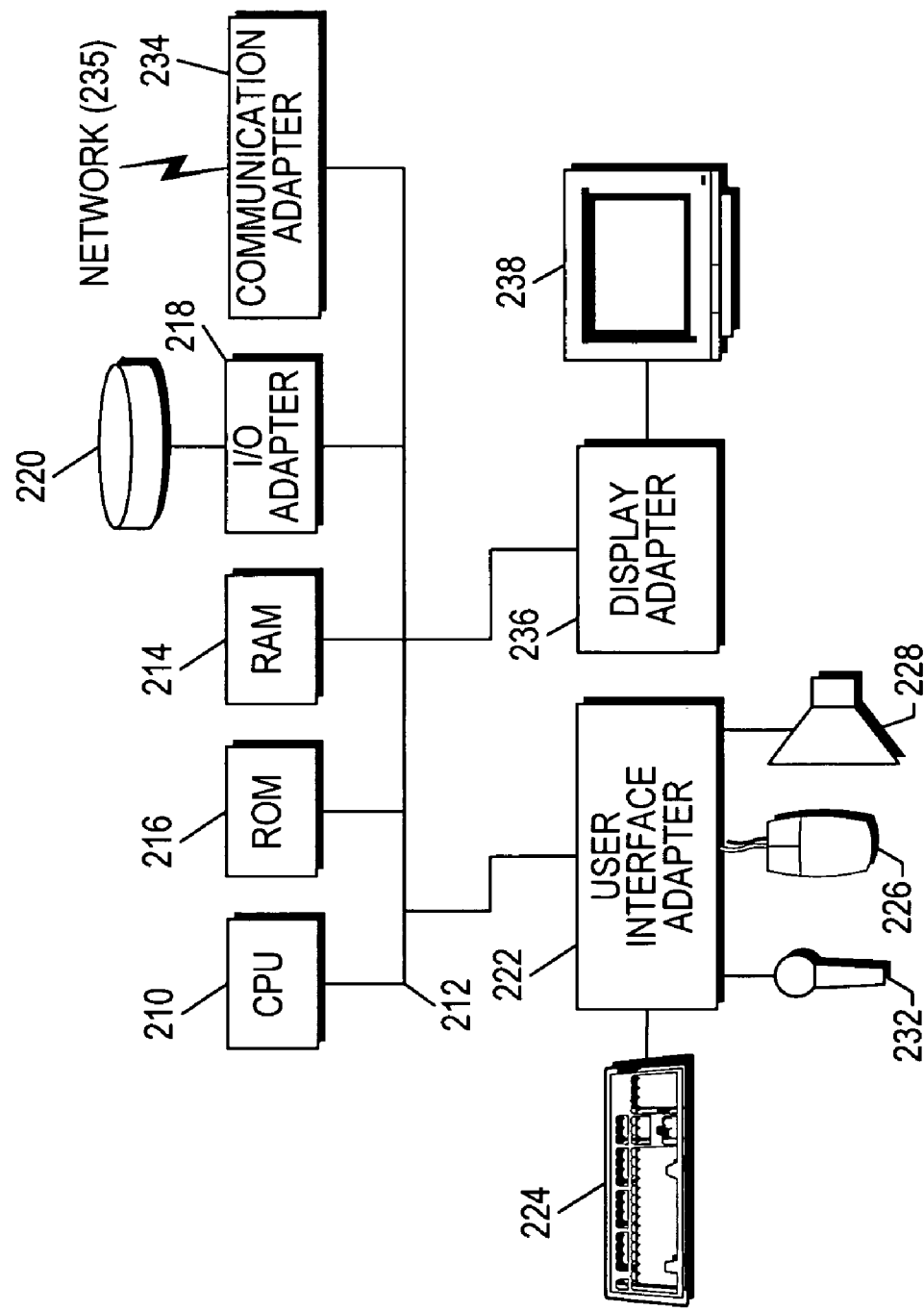
FIG. 2 shows a representative hardware environment for the various components of FIG. 1.

A representative hardware environment associated with the various components of FIG. 1 is depicted in FIG. 2. In the present description, the various sub-components of each of the components 102 may also be considered components 102 of the system 100. For example, particular software modules executed on any component 102 of the system 100 may also be considered components 102 of the system 100. FIG. 2 illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages along with an object oriented programming methodology. Object oriented programming (OOP) has become increasingly used to develop complex applications.

Figure 3:
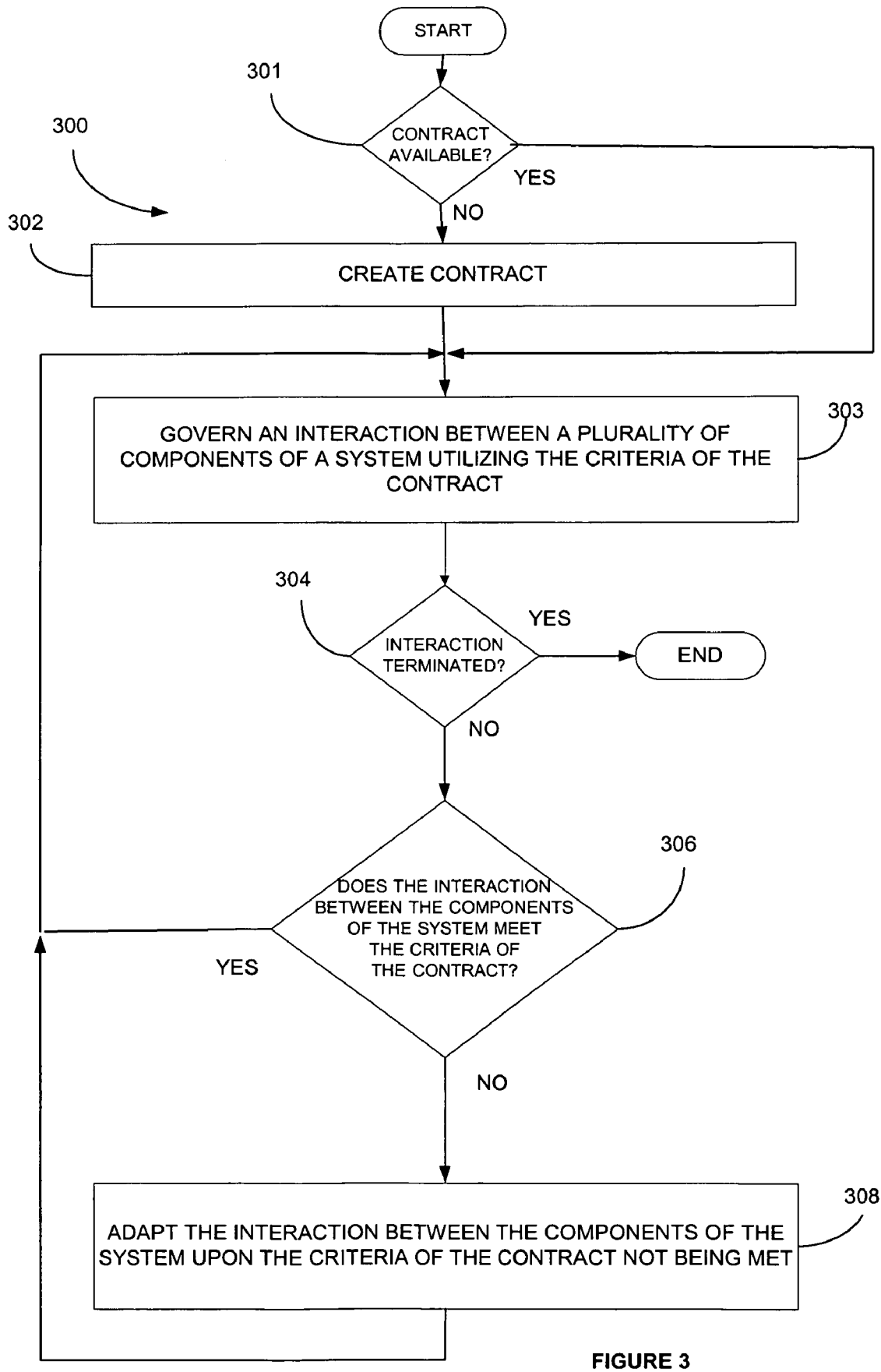
FIG. 3 shows steps taken for dynamic adaptation of a system in accordance with a contract having criteria associated therewith.

FIG. 3 is a flowchart illustrating a method 300 for dynamic adaptation of a system in accordance with a contract having criteria associated therewith. Such criteria of the contract may be based on various models. For example, the criteria of the contract may be based on a cost model. The cost model criteria may relate to resource utilization. In just one example, such cost model criteria may represent some percentage of resource utilization, or an amount of load on the system. In yet another embodiment, the cost model criteria may relate to performance, i.e. performance degradation. For example, such criteria may include a minimal speed parameter value. Still yet another example of cost model criteria may include provisioning of service. It should be understood that the cost model criteria may be based on any parameter representing a system aspect that is of value to the user. In each of the above examples, levels, standards and/or specifications associated with the criteria may be predetermined and saved for reasons that will soon become apparent.

As an option, a set of contracts may govern the interaction between any plurality of components. In this case, each contract of the set has unique criteria associated therewith. In such embodiment, each contract of the set may include criteria indicating which other contract of the set should be implemented upon a condition being met. In one example, such condition may include the satisfaction and/or failure of the system to meet the contract criteria.

As shown in FIG. 3, it is first determined in decision 301 whether there a contract exists. If not, a contract is created in operation 302. The initial formation of the contract(s) may be carried out in various ways. For instance, the components or the management entities for the components may be permitted to negotiate the criteria. In real-time or near real-time systems, control entities may be permitted to negotiate the criteria. This negotiation may be accomplished by any desired method one example of which will be set forth in greater detail during reference to FIG. 4.

During operation 303, an interaction between the components of the system is governed utilizing the criteria of the contract. In particular, the system and components are governed or controlled in a constant effort to meet the criteria of the contract. While the interaction is being governed in operation 303, it is possible that the interaction may terminate. Conditions for determination of interaction termination 304 may be implemented as part of the conditions of the criteria of the contract. Conditions for determination of interaction termination 304 may also be implemented within the management and control structure for the components. In either case, when a determination is made that in 304 that the components are no longer interacting, the method 300 is ended.

With continuing reference to FIG. 3, it is determined in decision 306 whether the interaction between the components of the system meets the criteria of the contract. This may be accomplished by monitoring various system parameters from which it can be determined whether the criteria are met. Upon it being determined in decision 306 that the criteria of the contract are not being met, the interaction between the components of the system is automatically adapted to conform to the criteria. Note operation 308. It should be understood that any one of the components of the system may be designated to carry out such adaptation. Additional detail will be set forth regarding the system adaptation of operation 308 in FIG. 5.

In a preferred embodiment, the interaction between the components of the system is adapted by adjusting the contract, thus altering the criteria. As an option, the contract may be adjusted using numerous methods. For example, such methods may include deactivation of the contract, modification of the contract, deletion of the contract, and/or activation of a different contract. After system adaptation, the interaction between the components of the system is governed utilizing the new criteria of the adjusted contract, as set forth in operation 303.

Figure 4:
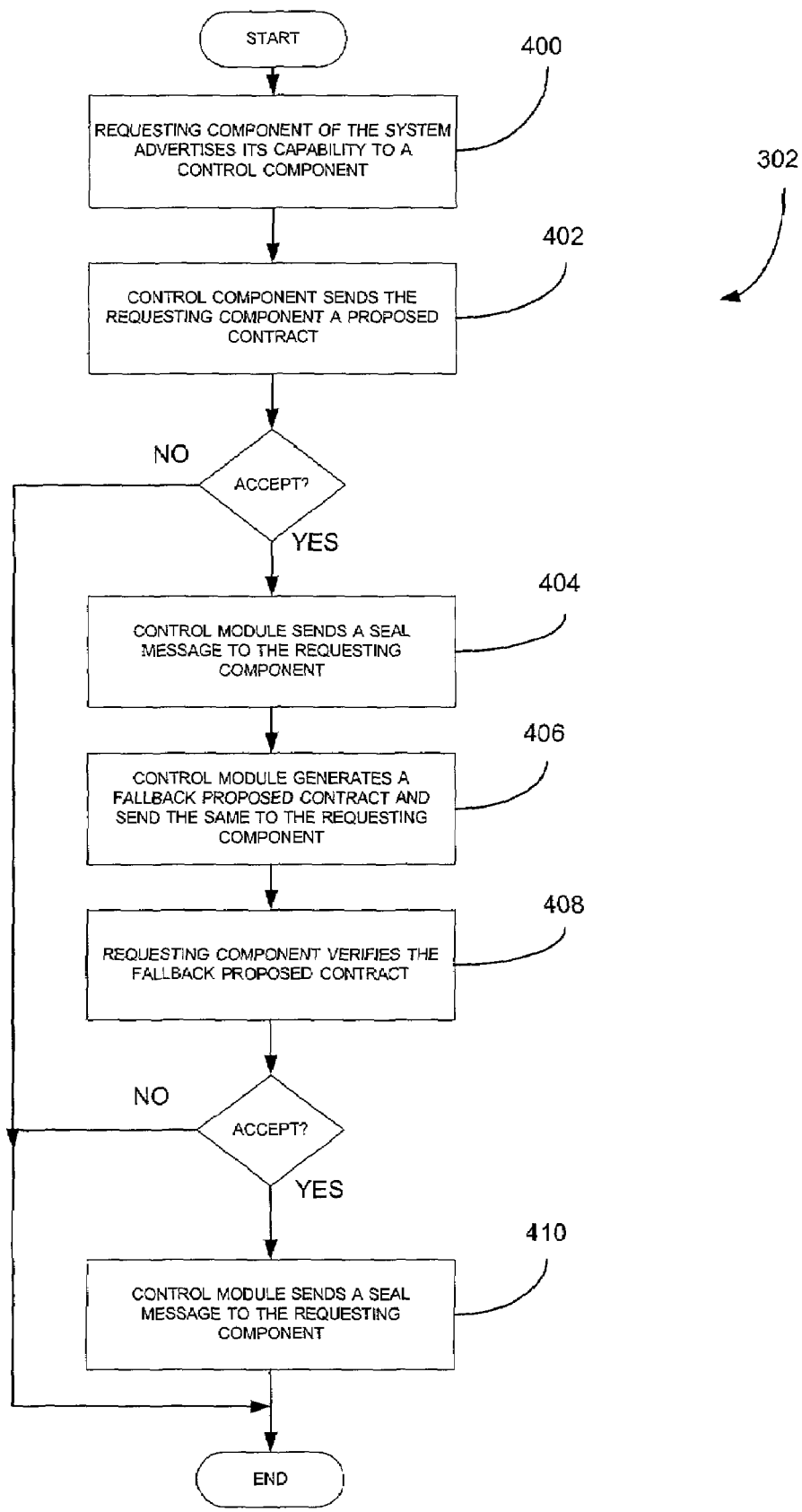
FIG. 4 shows one example of creating a contract between the components of the system.

FIG. 4 is a flowchart illustrating one example of creating a contract between the components of the system in accordance with operation 302 of FIG. 3. First, in operation 400, a requesting component of the system advertises its capability to a control component which handles contract negotiations. Thereafter, in operation 402, the control component sends the requesting component a proposed contract based on the capability and any other pertinent factors. As an option, the control component may choose a contract from a predetermined set. If the requesting component does not accept, the process is terminated and interaction is prohibited.

Upon the requesting component accepting the proposed contract, the control module sends a seal message to the requesting component thereby completing the contract negotiation. Note operation 404. As an option, the control module may also generate a fallback proposed contract and send the same to the requesting component, as indicated in operation 406. Upon receipt, the requesting component verifies the fallback proposed contract in operation 408. Again, in operation 410, the control module sends a seal message completing the fallback contract negotiation. It should be noted that the fallback contract is stored, but not activated, for use in case the first contract requires a replacement. This replacement can occur when the interaction governed by the first contract no longer meets the criteria of the cost model.

Another exemplary contract(s) negotiation scheme that is derived from the principles set forth herein may be found with reference to "Intrusion Detection Inter-Component Adaptive Negotiation" by Lee Benzinger et al. which is incorporated herein by reference in its entirety. See section labeled Intrusion Detection Inter-Component Adaptive Negotiation below.

Figure 5:
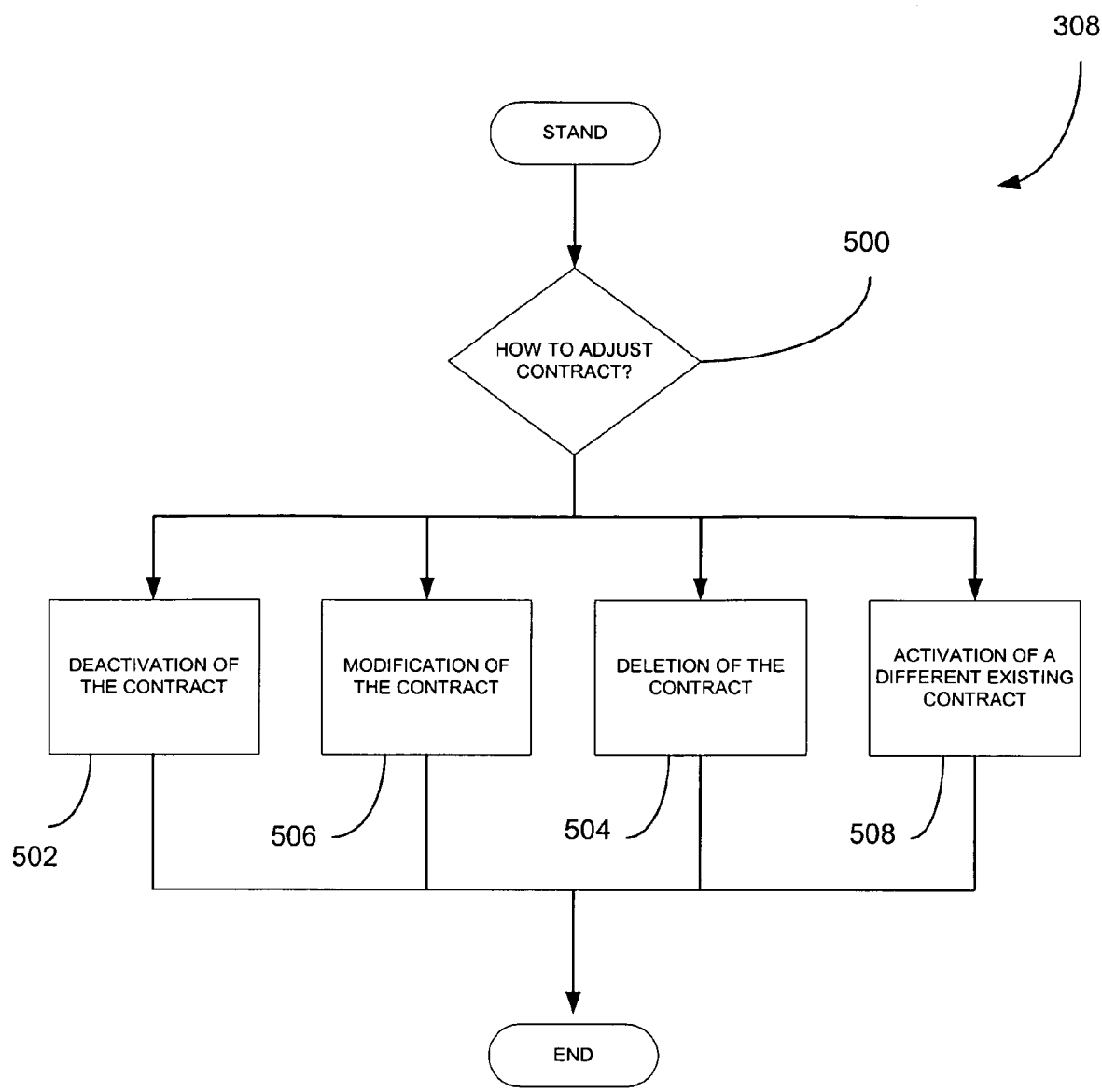
FIG. 5 shows the manner in which the interaction between the components of the system is adapted to conform to the criteria.

FIG. 5 is a flowchart illustrating the manner in which the interaction between the components of the system is adapted to conform to the criteria in accordance with operation 308 of FIG. 3. As shown, it is first determined how the system is to adjust the contract to achieve system adaptation. Note decision 500. This may be indicated within the contract under which components are currently operating or by another desired means. Based on the results of decision 500, a preferred embodiment may be capable of performing various functions.

In operation 502, the contract may be adjusted by simply deactivating the contract. In the alternative, the contract may be deleted in operation 504. Of course, the deactivation or deletion of the contract would not provide any means of continuing interaction, thus terminating the same. Still yet, the contract may be modified in operation 506. Such may include modification of the criteria by a predetermined formula, negotiation between parties, or any other desired means. As yet another option, a different contract, i.e. the fallback contract, may be executed in operation 508. Selection of the existing contract may be accomplished by simply selecting a separate contract stored in a database.

Figure 6:
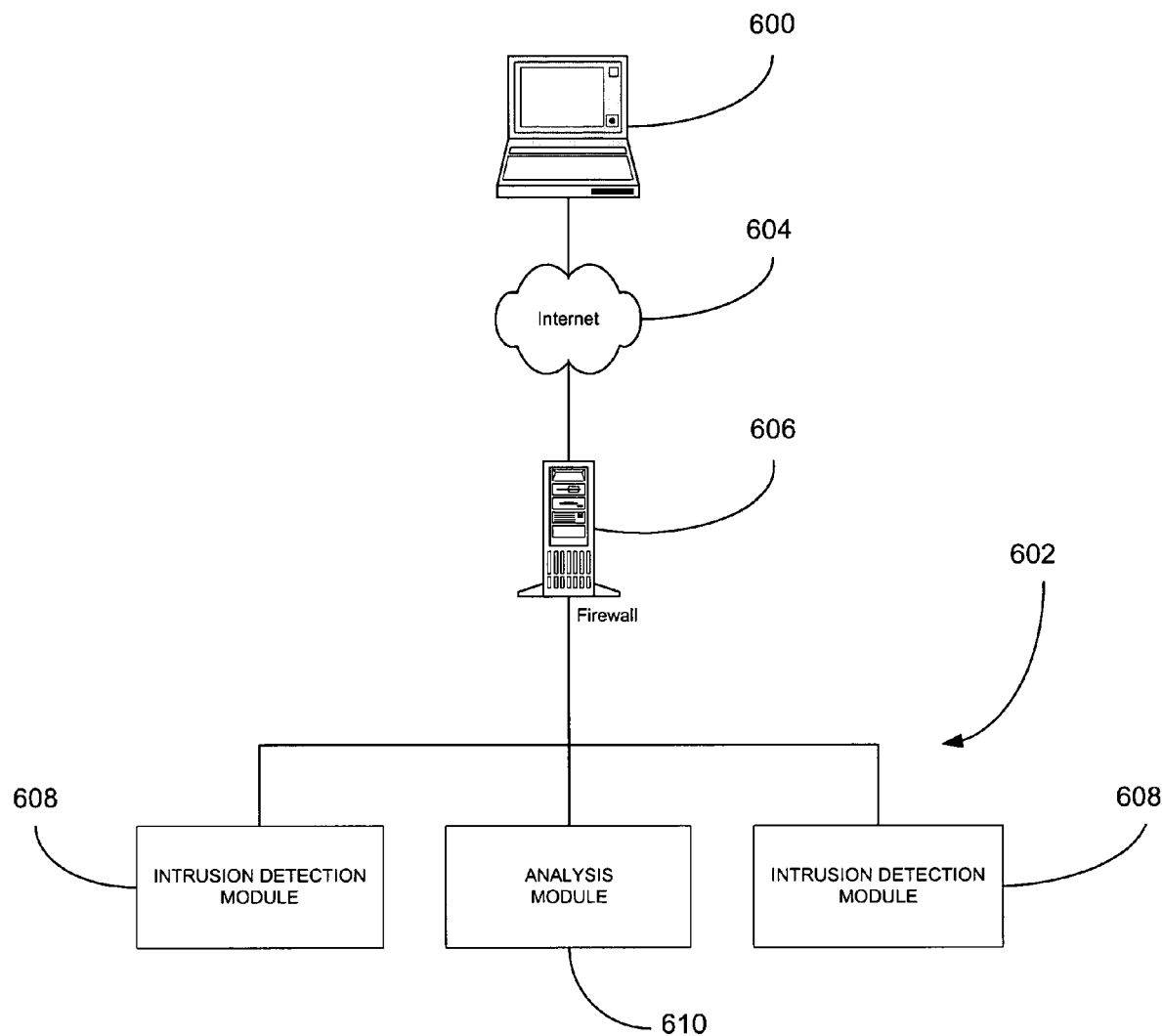
FIG. 6 shows an exemplary implementation of a preferred embodiment.

FIG. 6 is a schematic diagram illustrating an exemplary implementation of a preferred embodiment. Such example is set forth in the context of handling security-related events in a system via interaction and adaptation between the various components. In particular, the present example features how the system of a preferred embodiment may react to an intrusion by a hacker. It should be noted, however, that a preferred embodiment may be implemented to interact and adapt in response to any type of event, or even general aspects of the system.

As shown in FIG. 6, a plurality of components is interconnected in a manner similar to that shown in FIG. 1. In particular, a lap-top computer 600 is coupled to a local area network (LAN) 602 via the Internet 604. A firewall 606 is coupled between the Internet 604 and the LAN 602. The LAN 602 includes a pair of intrusion detection modules 608 and an analysis module 610. Prior to use, a set of contracts is established for each of the components of the LAN 602, the firewall 606 and the analysis module 610.

During use, such contracts dictate the manner in which the components of the LAN 602 and the firewall 606 interact and adapt to changing network conditions, as set forth earlier during reference to FIG. 3. In particular, the intrusion detection modules 608 are capable of communicating information being sent to and received from components behind and beyond the firewall 606 for the purposes of detecting intrusions and anomalies in the system.

In order to communicate information to and from other components in the system, the intrusion detection modules 608 and any other system component periodically send and receive generalized intrusion detection objects (GIDOS) which are data structures with information that may include, but not be limited to IP addresses of sources of the information, a timestamp indicating when the information was generated, an identifier of a host machine from which the information is received, a descriptor (an attack code) of a particular intrusion on the system that has been detected, and/or a user name of the entity which sent or received information. It should be understood that any type of data structure may be employed in lieu of GIDOS. For more general information on GIDOS, protocols, and other concepts derived from the principles set forth herein, reference should be made to "Gido Filtering Requirements and Design" by Stuart Staniford-Chen, and "IDIAN Protocol Design Version I" by Lee Benzinger et al. which are incorporated herein by reference in their entirety. See sections labeled Gido Filtering Requirements and Design and IDIAN Protocol Design Version 1 below.

The GIDOS are sent back and forth between the intrusion detection modules 608 and any other components through the analysis module 610. The analysis module 610 also has access to the contracts associated with each of the components of the system. Given the information supplied by the GIDOS, the analysis module 610 may thus govern the interaction between the intrusion detection modules 608 and any other components in order to ensure that the criteria of the contracts are met. If they are not, the analysis module 610 may adapt the interaction by adjusting the contracts in a manner set forth hereinabove during reference to FIG. 3.

In the present scenario, the lap-top computer 600 is employed by a traveling user to interact with the various components of the LAN 602. Further, the lap-top computer 600 is compromised by a hacker who wishes to infiltrate the system. Initially, the lap-top computer 600 may communicate with the analysis module 610 in order to establish, i.e. negotiate, etc., a contract(s) dictating criteria for interaction therewith.

In order to infiltrate the system, a distributed denial of service attack is executed by the lap-top computer 600. Such denial of service attack may include any method that overuses the resources of the system, thus compromising operability. In the present example, this is accomplished by overloading the intrusion detection modules 608 with GIDOS.

In response to the large influx of GIDOS, the analysis module 610 monitors whether it violates the criteria. In the case where the analysis module 610 utilizes a contract having cost model-based criteria, a predetermined maximum load amount of GIDOS/sec may be used as a trigger point to initiate system adaptation. It should be appreciated that such maximum load amount may be associated with the system as a whole, or with each of the components of the system individually. In order to determine whether or not the maximum load amount has been reached, the various components of the system are adapted to communicate current load amounts, in addition to any other necessary parameters, to the analysis module 610 using GIDOS. Of course, the maximum load amounts are set to ensure that enough system operability is maintained in order to allow communication of GIDOS for adaptation purposes.

Assuming that such maximum amount has been reached, the analysis module 610 may adapt the system per the terms of the contract. For example, if the GIDOS identify the lap-top computer 600 as performing a suspect attack, the contract associated with the lap-top computer 600 may be adjusted to restrict access to system resources. In a preferred embodiment, a fallback contract may be used which was negotiated before the lap-top computer 600 was permitted to use the system. In cases where there is a plurality of components such as the lap-top computer 600, the analysis module 610 may optionally adjust contracts of all of the components of the system in order to restrict access to system resources.

If after the system operates under the adjusted contract the system stabilizes to an acceptable level, the fallback contract may dictate that the original contract be reactivated in place of the fallback contract. If this results in a situation where the system is again under attack, the contract may then indicate that the lap-top computer 600 is most likely performing a forbidden attack, and the firewall 606 may be used to prevent any further communication with the Internet 604. In the alternative, the contract associated with the lap-top computer 600 may be deactivated or deleted.

The foregoing example is set forth in the context of handling security-related events by allowing such events to operate as a trigger for system adaptation. Additional details on the above example which were derived from the principles set forth herein may be found with reference to "Intrusion Detection Inter-Component Adaptive Negotiation" by Lee Benzinger et al. which is incorporated herein by reference in its entirety. See section labeled Intrusion Detection Inter-Component Adaptive Negotiation below. It should be noted, however, that a preferred embodiment may be implemented to interact and adapt in response to any type of event, or in response to general system conditions rather than any particular event.

Intrusion Detection Inter-Component Adaptive Negotiation

Intrusion Detection Inter-component Adaptive

Negotiation 1

Richard Feiertag, Lee Benzinger, Sue Rho, Stephen Wu ffeiertag, benzinger, rho, wug@tislabs.com NAI Labs at Network Associates, Inc.

3965 Freedom Circle

Santa Clara, Calif. 95054

Karl Levitt, Dave Peticolas, Mark Heckman flevitt, peticola, heckmang@cs.ucdavis.edu Computer Science Department University of California, Davis Davis, Calif. 95616

Stuart-Staniford-Chen stuart@silicondefense.com

Silicon Defense

791 Shirley Blvd

Arcata, Calif. 95521

Cui Zhang zhangc@ecs.csus.edu

Computer Science

Department

California State University

Sacramento, Calif. 95819-6021

Jan. 13, 2000

This work was supported by DARPA under contract F30602-97-C-0187.

ABSTRACT

The Intrusion Detection System (IDS) community is developing better techniques for collecting and analyzing data in order to handle intrusions in large, distributed environments [1, 5, 6]. To take advantage of this on-going work, IDSs should be able to dynamically adapt to new and improved components and to changes in the environment. The Intrusion Detection Inter-component Adaptive Negotiation (IDIAN) project has developed a negotiation protocol to allow a distributed collection of heterogeneous ID components to inter-operate and reach agreement on each other's capabilities and needs {i.e., the information that can be generated and processed. Moreover, the negotiation is dynamic so the information generated and processed can evolve as the IDS evolves or the environment changes.

The IDIAN project leverages the Common Intrusion Detection Frame-work (CIDF), an effort by DARPA to develop a common language, proto-cols, and APIs that allow intrusion detection components to interoperate and share information. The IDIAN project has extended the CIDF language CISL (Common Intrusion Specification Language) with constructs for dynamic negotiation. One such construct is the notion of a filter to specify sets of IDS messages. Filters are useful in negotiating, for example, what data will be transmitted. The IDIAN project also adopts the CIDF framework architecture that classifies ID components according to their function. The negotiation protocol uses the notion of a contract {an association between two ID components, a producer and a consumer {which contains one or more possible agreements. An agreement commits the producer to provide the consumer with a set of services. For example, a detection component (producer) might have a contract with an analysis component (consumer) to provide a specific set of audit data. At any give time, at most one of the agreements in a contract is in effect, although the ID components may switch to one of the alternatives dynamically. Furthermore, two components may have multiple contracts operating at the same time.

The primary function of the protocol is to allow ID components to dynamically negotiate new contracts/agreements and to change existing ones. An extension of the protocol is designed to handle hierarchical negotiations in which top-level components obtain the services of low-level components through intermediaries. To facilitate choosing among several options, the protocol uses the notion of cost to capture the relative cost to a producer (resp., consumer) to provide (process) a specific set of services. Services provided by producers require a variety of system resources. A consumer may decide to use a particular service only if the cost is below a certain threshold. The absolute and relative amount of resources required to supply a particular service may vary over time, and the protocol allows producers and consumers to renegotiate when necessary.

In addition to the protocol, the IDIAN project has developed several scenarios that demonstrate situations where an IDS must adapt to a changing environment. The scenarios can be divided into two general classes:

1. The acquisition of a new capability by the IDS. For example, an ID component may acquire a new attack signature or a new ID component may come on-line. The IDS must adapt by incorporating the new signature or ID component into the overall system.

2. An overload of the IDS caused, for example, by faults in the IDS itself or by a flooding attack. The IDS could adapt by reducing the amount of information being gathered, or by cutting of the row of data from the coding source.

The IDIAN project has developed a demonstration of the protocol in which a new producer comes on-line and negotiates with an existing consumer. The new producer can report buffer overflow attacks detected by the StackGuard [2] system. Finally, the IDIAN project is using the formal description language Estelle [3] to specify the negotiation protocol.

1 Introduction

The Intrusion Detection System (IDS) community is developing better techniques for collecting and analyzing data in order to handle intrusions in large, distributed environments [1, 5, 6]. To take advantage of this on-going work, IDSs should be able to dynamically adapt to new and improved components and to changes in the environment. The Intrusion Detection Inter-component Adaptive Negotiation (IDIAN) project has developed a negotiation protocol to allow a distributed collection of heterogeneous ID components to interoperate and reach agreement on each other's capabilities and needs {i.e., the information that can be generated and processed. This paper presents several different components of this research. Section 2 presents background information on the Common Intrusion Detection Framework, a body of research which the IDIAN project has leveraged. Section 3 presents a set of scenarios which demonstrate the need for adaptive negotiation. Section 4 presents research in constructs for expressing component capabilities, and Section 5 presents the protocol itself. Section 6 describes the testbed used to demonstrate the protocol in operation and Section 7 concludes the paper and explores areas of future research.

2 Common Intrusion Detection Framework

The Common Intrusion Detection Framework (CIDF) [4] is an effort by DARPA to develop a common language, protocol, and API that allow ID components to inter-operate and share information. Since a thorough exposition of CIDF would be too lengthy, we will only give enough information to understand the rest of the document.

2.1 CIDF Architecture

The CIDF architectural model divides an IDS into components, all of which have a persistent identity. New components may be introduced and other components may be removed. However, the model assumes that the lifetime of a component is long compared to both the time required to deploy the component and to the duration of intrusion incidents. Components consist mainly of software code with some configuration information (with the exception of database components which store extensive amounts of data).

1. CIDF components interact in a real-time data row model and exchange data using Generalized Intrusion Detection Objects (GIDOs). GIDOs consist solely of data (not code) and carry information about possible intrusions and responses to intrusions. GIDOs are discussed in greater detail in Section 2.2.

CIDF defines four types of components. First, event generators passively monitor sources of information and transmit that information using GIDOs. For example, an event generator might monitor an IP network and turn packet level information into GIDOs that are sent to other components. Another event generator might monitor host audit trails. Event generators send GIDOs to analyzers, the second type of component. Analyzers examine the incoming GIDOs, draw conclusions about what intrusive activity might be occurring, and create new GIDOs that encapsulate these conclusions and, possibly, prescribe responses.

Third, response components accept GIDOs that order a particular response (for example, killing a connection), and carry out the response. Finally, database components store GIDOs and provide answers to queries.

2.2 Generalized Intrusion Detection Objects

A GIDO consists of two components: a fixed format header and a variable length body. (There may also be GIDO addenda and signatures, but these are beyond the scope of this discussion.) The header contains information such as the version of CIDF in use, a timestamp, and the length of the body.

We explain the structure of the body using a sample body (FIG. 1A) that might be generated by the StackGuard-based event generator described in Section 6. This GIDO body expresses the fact that an attack occurred on the host somehost.someplace.net, was detected by the StackGuard process, and was directed at the fingerd program. The structure of GIDO bodies is that of Lisp S-expressions; the parse tree of the expression is explicitly delineated with parentheses. Two kinds of constructs occur within the GIDO body. The first is actual data (all of which is shown in single quotes in FIG. 1A). The second type of construct is a Semantic Identifier (SID). There is a SID associated with each piece of data in the body. For example, the SID associated with the data 'fingerd' is ProcessName, indicating that the string 'fingerd' refers to a process name. SIDS which are directly associated with data are called Atom SIDS.

The Atom SIDS alone, however, are not sufficient. Above the Atom SIDS in the parse tree are additional SIDS which describe how the atoms of data combine to form a more complex meaning. FIG. 1A is a sample GIDO body. For example, the Attack SID in the example is a Verb SID. Verbs describe events, in this case an attack.

Every Verb SID has a set of Role SIDS that may appear beneath it. Role SIDS provide additional information about the event (beyond the mere fact that, e.g., an attack occurred). For example, the Observer Role provides information about the observer of an event (in this case the StackGuard process). Roles are completed by supplying the Atoms beneath them (such as ProcessName); the Atoms tie the actual data into the structure.

Multiple events, each with their own verb-headed S-expression, can be joined together with conjunction SIDS, such as And. In the example, the attack is linked to the fingerd process with the ByMeansOf conjunction.

GIDOs are flexible in that a GIDO producer can leave out any unavailable information and may choose what information to include.

We note that the ASCII representation of the GIDO body shown above is not the format used in transmission. The CISL specification defines a compact GIDO representation for transmission and storage.

Finally, because the GIDO body is the main component of a GIDO, hereafter GIDO bodies are referred to as GIDOs.

3 Negotiation/Adaptation Scenarios

This section describes some of the scenarios which the IDIAN project has developed to illustrate the need for adaptive negotiation.

3.1 New ID Component or Capability

ID systems must function continuously; any gaps in operation leave the protected system vulnerable to attack. However, the configuration of an IDS may be dynamic. Specifically, an IDS should incorporate new resources and technology, in the form of new ID components or new capabilities of existing components, while maintaining continuous operation.

In order to incorporate a new ID component, the other components in the IDS must be aware of the new component's capabilities, i.e., the data it can provide or consume. Additionally, the other components may only want to use a subset of the new capabilities in order to conserve resources and to utilize resources efficiently.

For example, a network sniffer may be able to provide data on every packet traversing the network to which it is connected. However, a specific analyzer may only be able to detect intrusions based on the file transfer protocol (FTP). Therefore, the analyzer should be able to negotiate with the sniffer to obtain only FTP packets. This would allow both components to operate more efficiently in that the sniffer only needs to format and transmit FTP packets and the analyzer will only receive packets it can analyze. Thus, the negotiation protocol must provide:

1. The ability to publish the capabilities of a new component. This requires the ability to describe capabilities and to disseminate descriptions to other components.

2. The ability for collections of components to determine a specific set of capabilities that they will use. Thus, the protocol must be able to describe the data to be exchanged and to provide a quantitative measure of the resources required to provide that data. Other information may also be required, such as the latency for providing the data or a negotiation progress metric to ensure that the negotiation will terminate.

These abilities are also useful when new capabilities are added to an existing component. For example, new response capabilities may be added to an operating system, such as the ability to maintain a log of a user's actions. The OS would announce these capabilities and possibly negotiate with an analyzer to accept requests for these new responses.

3.2 Overloading and Flooding

The second class of scenarios where adaptation and negotiation are important are those in which the IDS becomes overloaded. Overloading can occur due to faults on the network, on hosts, in applications, or within the IDS itself. Alternatively, overloading might be due to deliberate attempts to flood the IDS by an attacker.

For example, an event generator which is monitoring an on-going attack could generate so much audit data that the analyzer is unable to handle the load. In such a situation, an analyzer may wish to:

Request the event generator to switch to a pre-negotiated \fallback" setting in which only critical audit data is sent.
Request that other event generators reduce their output so the analyzer can concentrate on the attack.

Thus, the negotiation protocol must support both the negotiation of "fallback" or alternative positions and dynamic switching among those positions.

4 GIDO Filters

Negotiating over services requires the ability to express what services are ordered or desired. For example, an event generator must be able to express the particular set of events that it can detect. Conversely, an analyzer must be able to express the set of audit data it can analyze.

Since, in the CIDF framework, all communication is in the form of GIDOs, the services which, for example, an event generator can provide can be represented by the set of all GIDOs it can generate. Consider again the GIDO in FIG. 1A. That GIDO is generated in response to a StackGuard detection of a stack overflow. The structure of the generated GIDO is always the same only the data fields change. Thus, the service the StackGuard detector provides is represented by the set of all such GIDOs.

Similarly, the audit data which an analyzer requires might be represented by the set of all GIDOs it can process. Finally, the services of a response component could be represented as the set of response GIDOs it understands and can carry out.

The IDIAN project has developed the notion of a GIDO filter, a construct used to describe a set of GIDOs. GIDO filters are themselves GIDOs (or, perhaps, meta-GIDOs) that ID components can use to specify the services they provide or require.

4.1 Filter Requirements

The IDIAN project has identified a number of requirements for GIDO filters.

We list the main requirements below:

1. Filters should be expressive enough that components can specify all sets of GIDOs that are useful to them. In particular, it must be possible to specify only part of the GIDO required to match the filter, allowing the GIDO to contain additional information that is not of interest. It must be possible to filter on any data field in the GIDO, and on any combination of data fields.

2. Filters should allow the possibility to specify sets of hosts, users or other categorical variables in a convenient way.

3. Filters should allow the extraction of particular data values from matching GIDOs, so that only the data of interest, rather than the whole GIDO, is sent.

4. The filter language should allow for efficient implementations.

5. Given two filters, F1 and F2, which match sets of GIDOs G1 and G2 respectively, it should be possible to define unambiguously a filter matching the union of G1 and G2, and a filter matching the intersection of G1 and G2. This requirement facilitates the construction of more complex filters when, for example, an event generator can produce many different kinds of event GIDOs.

6. Filters should have conceptual clarity. People who understand GIDOs should be able to easily write and understand GIDO filters.

4.2 Filter Design

In general, the format of a filter is the same as the format of a GIDO as explained in Section 2.2, with certain extensions. The main difference between an ordinary GIDO and a filter is in the body. The basic filter body starts with the Filter SID as shown in FIG. 2A. FIG. 2A illustrates a sample filter.

A Filter can contain two SIDS: Fragment and Permit. A fragment specifies a "piece" of a GIDO. A GIDO matches a fragment if the piece specified by the fragment occurs anywhere in the GIDO, although the GIDO may contain extra information not in the fragment.

A fragment contains variable names and data expressions which appear in the fragment in place of actual data. A variable/expression pair will match any actual data in a GIDO which matches the expression. Thus, the GIDO in FIG. 1A matches the fragment in FIG. 2A, with the variables observer and target instantiating to 'StackGuard' and 'somehost.someplace.net' respectively (assuming expressions exp1 and exp2 match those data items).

The use of variables in filters allows only the relevant information (i.e., observer and hostname) to be transmitted rather than the whole GIDO.

The Permit SID specifies any number of SIDS which must appear at the top of a GIDO's parse tree. A GIDO matches a filter if it matches both the fragment and the permit clauses. The example filter specifies that matching GIDOs must have ByMeansOf as their first SID, and thus the GIDO of FIG. 1A matches the filter of FIG. 2A.

Basic filters may be joined using AndFilter and OrFilter. AndFilter expressions must appear below the OrFilter, if present. Example: (OrFilter (AndFilter (Filter . . . ) (Filter . . . ) . . . ) (Filter . . . )) A GIDO matches an OrFilter (AndFilter) if it matches any (all) of the child clauses.

Please note the design of filters is an active area of research. This section presented the current state of GIDO filters as of this writing.

5 The Negotiation Protocol

This section describes the components of the IDIAN negotiation protocol, including the state model, message types, and the infinite state machine description of protocol interactions.

5.1 State Model

Under the protocol, each component has a state composed of the elements below.

Agreement: An agreement is a relationship between a producer and a consumer. An agreement specifies a set of services which the producer must provide to the consumer. For example, an event generator may agree to provide a particular set of audit data to an analyzer. At a minimum, an agreement must specify the producer, consumer, and the set of services to be provided.

Contract: A contract is a set of agreements, each of which involve the same producer and consumer (the partners to the contract). At all times, exactly one agreement in a contract is in effect. Thus, the agreements in a contract constitute a set of alternatives. Every contract has an implicit "null" alternative in which no service is provided.

Contract Database: A contract database is a set of contracts. Every component has a contract database containing all the contracts to which it is a partner.

Capability Database: A capability database associates services (e.g., provide IP audit data, filter packets, etc.) with the components which can provide those services. Each component has a database containing its own capabilities and, possibly, those of other components.

The state of a component consists of its contract and capability databases.

The IDIAN protocol defines the steps by which a component's state may be changed, i.e., how contracts and agreements are negotiated, altered and removed, and how capability databases are updated.

5.2 Protocol Description

A portion of the IDIAN negotiation protocol is graphically depicted in FIG. 3A in the form of a state machine. The machine shows the allowed behavior of a consumer component during a negotiation. Transitions are labeled with the message types which cause the transition. Dotted (resp. solid) lines are transitions caused by the consumer sending (receiving) a message to (from) the producer. The diagram for a producer component is mostly identical to that for a consumer, but with the dotted and solid lines switched.

The diagram only depicts the portion of the protocol specifically related to negotiation (the creation and modification of contracts). Other states and transitions related to, e.g., removing contracts or dynamically switching among existing agreements have been omitted for clarity. FIG. 3A illustrates The negotiation protocol—consumer The basic consumer protocol consists of four states: Run, Open Negotiation, In Negotiation, and Decide Response. In the Run state, a consumer is performing normal operation, i.e., accepting and processing incoming GIDOs.

While in the Run state, a consumer can receive Advertisement messages from producers or initiate a negotiation by sending a Proposal message.

Advertisement: A component sends an Advertisement to announce its capabilities. An Advertisement contains a filter to denote the set of GIDOs which it can produce or consume. A component receiving an Advertisement could use the information to update its capability database, or decide to initiate a negotiation to obtain the advertised services. Note that the reception of an Advertisement in the Run state is not shown in FIG. 3A.

Proposal: A Proposal is used to initiate a negotiation. The component sending the proposal is the consumer, while the recipient is the producer. A Proposal contains a filter specifying the service the consumer is requesting. The object of a negotiation is always a specific agreement in a specific contract. The contract may already exist, in which case the consumer is proposing to change an existing contract, otherwise the consumer is proposing to create a new contract. The same applies to the agreement.

Once the consumer has sent a Proposal, it enters the Open Negotiation state to await the producer's response. Negotiations in the IDIAN protocol are atomic {any given component can be negotiating with at most one other component at any time.

During a single negotiation session (the time between leaving and then returning to the Run state) a consumer may negotiate several agreements, all of which must be in the same contract. The variable n in the diagram records the number of agreements which have been negotiated so far.

A producer that has received a proposal can respond with one of several types of messages:

Accept+Cost: The producer accepts the proposal and provides an estimate of the cost to supply the requested service.

Subset+Cost: The producer rejects the proposal because it does not have the resources to provide all the requested service. This message includes a filter specifying a subset of the services which the producer could provide and the cost of providing it.

Reject+Advertisement: The producer rejects the proposal because it is unable to supply the requested service. In addition, the producer provides an advertisement of its current capabilities.

Refuse+Reason: The producer refuses to negotiate with consumer and provides a reason for the refusal. Possible reasons include the fact that the producer is negotiating with another component (all negotiations are atomic) and the fact that the consumer does not have authority to negotiate with the producer. Refusals terminate the negotiation immediately, so the consumer returns to the Run state.

Upon receiving a Reject message, the consumer enters the In Negotiation state, from which it can send another proposal, or Cancel the negotiation altogether. A consumer that has received an Accept or Subset message enters the Decide Response state, where it must choose between accepting or rejecting the producer's offer. Even if the producer simply Accepted the proposal, the consumer may still reject if it deems the cost too high.

Cancel: The consumer rejects all the agreements negotiated so far (n may be greater than zero) and terminates the negotiation.

Counter-Proposal: A Counter-Proposal implicitly rejects the producer's offer and offers a new proposal instead.

Accept+Alternative: The consumer temporarily accepts (pending a Seal message) the previous negotiation and offers a new one representing a different agreement in the same contract. Negotiation now begins on this new proposal.

Seal All: The consumer accepts all of the agreements negotiated so far and ends the negotiation. The contract databases of both components are updated to reject the changes.

Seal n: The consumer accepts all of the agreements except the one currently under negotiation, which is rejected. The negotiation ends and the contract databases are updated.

Seal All and Seal n are the only messages which cause the components' contract databases to be changed, after which the new agreements immediately go into effect.

5.3 Additional Protocol Features

The previous section presented that subset of the protocol directly related to negotiation. However, the protocol contains additional features. Specifically, the protocol supports messages which accomplish the following:

Termination of agreements and contracts.

Querying of component capabilities and contract status.

Dynamic switching among agreements.

Furthermore, an extended version of the protocol has been developed which supports hierarchical negotiation. Under hierarchical negotiation, the ID components are arranged in a hierarchy, such as in FIG. 4A. FIG. 4A illustrates a Hierarchical negotiation.

In hierarchical negotiation, consumers may only negotiate with producers directly below them in the hierarchy. Components in the middle layers of the hierarchy behave as producers with respect to the components above, and like consumers with respect to the components below.

For example, when high-level consumer A sends a proposal to component B, component B may, in turn, negotiate with low-level producers C and D to obtain the requested service for A.

Hierarchical negotiation could be used, for example, to help manage very large IDS systems.

5.4 Protocol Specification

The IDIAN project has developed a formal specification of the protocol in the Estelle [3] description language. Estelle is a Pascal-like language with constructs for specifying processing, communication channels, and state transitions.

FIG. 5A shows a fragment of the Estelle specification of a consumer. The fragment specifies component behavior during the state transition from Run to Open Negotiation, in which a suitable producer is selected and a proposal is transmitted. The function SelectOneComponent is left unspecified, a useful feature of Estelle. FIG. 5A illustrates a fragment of the protocol specification.

Both the basic and hierarchical versions of the protocol have been specified. In the future, the project plans to use the Estelle specifications together with the XEC Estelle compiler [7] to aid in protocol implementation and analysis.

6 IDIAN Demo

The IDIAN project has developed a demonstration of a subset of the protocol on a testbed consisting of two computers running Linux, shown in FIG. 6A.

Upon startup, the event generator sends an advertisement message to the analyzer, announcing the fact that it can generate notifications of stack overflow attacks. The analyzer negotiates with the event generator to monitor a set of programs for stack overflow. The specific set can be adjusted by the user by using the GUI, and the analyzer will renegotiate the contract. FIG. 6A: illustrates the protocol testbed.

Upon receiving a GIDO notification of a possible attack, the analyzer passes it to the GUI for display to the user. The event generator monitors the system logs for messages from StackGuard [2] code that identifies possible stack overflow attacks. Any such messages are transformed into GIDOs, but those GIDOs are sent only if they match the filter in the contract which has been negotiated with the analyzer.

Currently, the demo uses a subset of the protocol and supports a single contract with a single agreement.

7 Conclusions and Future Work

This paper has presented the work of the IDIAN project in developing a protocol that allows ID components to negotiate over the provision of ID services such as detection capabilities and response mechanisms. The protocol enables components to create contracts which bind producer ID components (e.g., audit generators) to provide their services to consumers (e.g., analyzers).

The project has demonstrated the potential feasibility of this approach using a testbed consisting of two systems which negotiate over the set of audit data to be shipped.

Many open areas of research remain. For example, the current implementation of filters uses full Perl expressions in the filter GIDO to match data values. This approach could raise issues of security and efficiency. More work is needed in the area of filter design.

Another open area of research involves the measurement and expression of cost {the amount of resources a component requires to provide a set of services. Since there are so many resources involved in providing a service (memory, CPU time, network bandwidth, etc.) and since these resources can change dynamically, accurately estimating and communicating cost information is a major challenge.

Also, the IDIAN project plans to create a larger testbed involving more than two systems in order to test a complete version of the basic protocol as well as the hierarchical extension.

Finally, an interesting project would be to incorporate the IDIAN protocol into existing ID components to further explore the protocol's applicability.

REFERENCES

[1] J. Balasubramaniyan et al. An architecture for intrusion detection using autonomous agents. Technical Report Coast TR 98-05, Department of Computer Sciences, Purdue University, 1998.

[2] C. Cowen et al. Stackguard: Automatic adaptive detection and prevention of buffer-overflow attacks. In Proceedings of the 7th USENIX Security Conference, 1998.

[3] ISO/TC97/SC21. Information processing systems|Open systems interconnection |Estelle| a formal description technique based on an extended state transition model. IS 9074, International Organization for Standardization, Geneva, 1997.

[4] C. Kahn et al. A common intrusion detection framework. http://seclab.cs.ucdavis.edu/cidf/papers/jcs-draft/cidf-paper.ps, 1998.

[5] U. Lindqvist and P. A. Porras. Detecting computer and network misuse through the production-based expert system toolset (P-BEST). In Proc. 1999 IEEE Symposium on Security and Privacy, Oakland, Calif., May 1999.

[6] A. Mounji. Languages and Tools for Rule-Based Distributed Intrusion Detection. PhD thesis, Computer Science Institute, University of Namur, Belgium, September 1997.

[7] J. Thees and R. Gotzhein. Protocol implementation with Estelle {from prototypes to efficient implementations. In Proc. Estelle '98, Evry, France, 1998.

Gido Filtering Requirements and Design

Gido Filtering Requirements and Design

Draft 000302.1

Stuart Staniford-Chen

Silicon Defense

Dave Peticolas

UC Davis

0. Introduction

This document defines the requirements and design for filter expressions which can be used to specify sets of CISL gidos [CISL] that match the filter. It also contains a discussion of filter negotiation as used in the IDIAN project [IDIAN].

1. High Level Requirements for Gido Filtering:

[Author's note: section 1 is not up to date].

1.1. Filters should be expressive enough that parties can specify all the sets of gidos that are useful to them. In particular, it must be possible to specify only part of the gido required to match the filter, allowing the gido to contain additional information that is not of interest. It must be possible to filter on any data field in the gido, and on any combination of data fields.

1.2. Filters should allow the possibility to specify sets of hosts, users or other categorical variables in a convenient way, so that data at a particular point in the gido can be any one of the set and still match.

1.3. The filters should be precise. It should be exactly determinable what gidos meet a filter and what don't. In particular, the filter language should be purely syntactic. It should be possible to tell whether a gido matches a filter without knowing anything about the meaning of the SIDS involved, but only the datatypes of the SIDS in question (except for the needs of requirement 4).

Rationale: Filtering is distinct from analysis in that filtering is supposed to be dumb and not require intelligent understanding of the gido. Hence we can and should demand a high degree of precision.

1.4. Filters should allow a way to extract particular data values out of the incoming gidos, so that rather than returning the whole gido, only the data of interest need be returned.

1.5. Filters should support the possibility of use in a simple signature mechanism—that when an incoming gido matches a filter, a response gido is sent to some appropriate R-box.

1.6. The filter language should allow for efficient implementations. In particular, it should allow for implementations that are tightly integrated with encoding and decoding, or implementations in which filters are sent to the producing side in order to minimize what data was sent. Also, the process of matching a gido to a filter should have a polynomial time implementation.

Rationale: it would help overall efficiency greatly if it were possible to only partially decode or encode messages which were not going to meet the filter. Therefore, the filter design should not preclude this possibility.

1.7. There should be an explicit way to define the geographic scope of filters. It should be possible to tell what hosts and networks could generate and/or consume gidos that match filters like this.

Rationale: this supports the use of filters in a plug/play implementation 1.8. Given two filters, F1 and F2, which match sets of gidos G1 and G2 respectively, it should be possible to define unambiguously a new filter Fu which matches the union G1 and G2, and a new filter F1 which matches the intersection of G1 and G2. These new filters should be computable in polynomial time.

Rationale: This is required for negotiation between components as to what gidos should be sent where.

1.9. It must be easy to construct filters which are subsets of an existing filter.

Rationale: In negotiation, this allows easy construction of lower cost proposals.

1.10. It must be easy to determine when a filter is equivalent to the null filter (a filter which matches no possible gido).

1.11. Conceptual clarity. For folks who understand gidos, it should be easy to write or understand a gido filter that does what they need. In particular, as much of the existing gido structure as possible should be used in filters, rather than defining wholly new constructs.

2. Filter Design

In general, the format of a filter is the same as the format of a gido as defined in [CISL], with certain extensions and differences. Only the extensions and differences are documented here, and the reader is assumed to be familiar with [CISL]

2.1 Filter Header.

The filter header is the same format as a gido. Present implementations do not use these fields for anything, and they should not be relied on (except that they take up the requisite amount of space).

2.2 Filter Body 2.2.1 Introduction

The body of a filter has a special form, including a few special SIDS. A filter is an S-expression headed by the 'Filter' SID. A filter clause contains one or more 'Fragment' clauses together with zero or one 'Permit' clauses. (But note the additional restrictions involved during filter negotiation as described in section 4).

An example filter with a single fragment is the following:

```
(Filter
   (Fragment
      (ByMeansOf
         (Attack
            (yada yada)
         )
         (TCPConnect
            (Source (IPV4Address "!+:src:{10.0.0.0/24}")
               (UserName "?+:user:{{joe,sam},{abdul}})
               (Destination (IPV4Address "!-:dest:{10.0.0.0/
                  24}"))
         )
      )
   )
   (Permit HelpedCause ByMeansOf And)
)
```

This filter expression can be compared to gidos, and used to determine if particular gidos match. It can also be used to extract particular data values from the gido and tag them with names that are defined in the filter. This is useful in the process of analyzing and processing gidos.

The conceptual model used is that each fragment in the filter should "look like" a piece of the gido that is to be matched. Here looks like means that the layout of the fragment and the corresponding piece of the gido should be the same (modulo some exceptions documented below). The permit clause allows the filter matching code to search the gido from the root looking for fragments. Any SIDS that appear in the permit list can be passed through freely in looking for fragments. So in the example above, we are looking for a fragment like (ByMeansOf (Attack . . . ) (TCPConnect . . . )). However, this fragment could appear under any number of layers of 'HelpedCause', 'ByMeansOf', or 'And' SIDS that might be in the gido.

2.2.2 The Permit Clause

The Permit clause may or may not be present. If present, it is typed as a string, and must contain one or more SID names defined in [CISL]. The SIDS appear as their names, not their codes, and are separated by whitespace. Additional SIDS defined in this document but not in [CISL] are specifically excluded from the values allowed after the Permit SID.

In matching a gido from the top, an implementation should first attempt to match fragments directly against the top SID. If any fragments do not match, and the gido top SID is in the permit clause, then fragments should be matched against all the SIDS directly underneath the top SID. If not all fragments have been matched, and some of the child SIDS in the gido are in the Permit clause of the filter, then the matching should be attempted below these, and so on recursively.

Gidos that match this filter, can have any number of the things in the "Permit" clause at the top of the gido tree. The filter matching logic will traverse down through the "Helped-Cause"s, "ByMeansOf"s and "And"s looking for anything that appears like the Fragment.

If no Permit clause is present, then all fragments must match at the top in order for a match to occur.

2.2.3 Fragment Matching

For a fragment to match a clause in a gido means that all the pieces in the fragment must appear in the gido clause, though the gido may contain extra branches to the tree. Thus the tree defined by the clause structure and SIDS of the fragment must be a (possibly non-proper) subtree of that defined by the gido clause.

Note that it is possible for several fragments to match in the same gido clause, or overlapping gido clauses. This is not usually desirable, but it is for the filter writer to avoid this situation.

A filter fragment also differs from a gido clause in that where data would appear in the gido, a data expression must appear in the filter. These are always ASCII strings, and are always encoded as arraychar in the CISL encoding of filters—which are otherwise encoded identically to gidos. Data expressions are covered in more detail in section 3. For the fragment to match a clause requires that all data values in the gido match the corresponding data expressions in the fragment.

Data expressions in filters may contain a variable name. The idea is that when a gido matches the fragment, it is possible to only return the (variable value) pairs instead of the whole gido (see [API] for example). The caller/sender must maintain state to determine the meaning of such gidos. Where multiple data expressions in a filter use the same name, only one datum will be passed back. If the expressions bind to different data in the gido, it is implementation dependent which gets passed back.

In any given clause that is a descendant of a (Fragment . . . ) clause of a filter, a given SID may not appear multiple times. Thus,

```
(Fragment
   (And
      (Copy . . . )
      (Copy . . . )
   )
)
``` is illegal. Where multiple clauses headed with the same SID appear in a gido to be matched to a filter, the interpretation of the filter clause is that *all* the corresponding filter clauses must match it.

For example, if we have

```
(Fragment
   (And
      (SomeSID [expression])
   )
)
```

Matching to a gido containing

```
(And
   (SomeSID [sub1])
   (SomeSID [sub2])
)
``` then *both* [sub1] and [sub2] must match to [expression]. Note that this is true whether 'SomeSID' takes a data value directly, or is followed by subsidiary clauses.

If this kind of situation results in bindings matching multiple times, it is implementation dependent which of the possible values for the binding is returned.

3. Data Expression Syntax

A data expression consists of two mandatory modifier characters, a mandatory colon, an optional name, a mandatory colon, followed by the data expression proper. (The name is used as a key in passing the data back in a set of bindings from the routine that matches gidos to filters).

The grammar is

<data-expression>:=<modifiers>':'<option-list>
 |<modifiers>':'<varname>':'<option-list>

<modifiers>:=<negotiable-char><availability-char>

```
<negotiable-char>:='+'|'-'
<availability-char>:='?'|'!'
<varname>:=<alpha-numeric-string>
<option-list>:='{'<options>'}'|'*'
<options>:=<option>|<option>','<options>
<option>:='{'<values>'}'|<ipnet>
<values>:=<value>|<value>','<values>
<value>:=<alpha-numeric-string>
<ipnet>:=<alpha-numeric-string>
```

The modifiers are most important during a negotiation of filters (see section 4). At the time of filtering, the modifiers have the following meanings !: This means that the field is "Always available". If this field is not available to be sent by a producer, then no gido should be sent at all. The gido only matches the filter if the field is present in the gido, and the data expression matches.

?: This means that the field might or might not be present in the filter. If the field is not available, it shouldn't be sent, but the rest of the gido can be. Thus, on the consumer side, if the field is absent, then the rest of the match can continue to be checked. If the field is present in the gido, then it must match the data expression in order for there to be a match of gido to filter.

+: Field is negotiable. Has no meaning during filter matching.

-: Field is not negotiable. Has no meaning during filter matching.

The varname is a symbolic name given to this field by the filter. It is used primarily for referring to the field in API calls, etc. Conceptually, it is a variable which is assigned a value if the gido matches the filter, and the value assigned will be the data value present in this field in the gido.

The core of the data expression is notionally a set of disjoint sets of the underlying data values. For example, if the field is "UserName", then a data-expression might be {{joe,kate},{fred,ewana,kristin},{abdul}}

The individual subsets are called "options" in the data expression. A data field in a gido matches if that value is present in some option. Thus a gido with 'kate', or 'abdul' in that position would match, but one with 'jack', would not.

The special option list '*' is a wildcard which means that any data value would match this data expression.

4. Negotiating Filters

4.1 Framework

Filter negotiation proceeds in several steps. An overview of the entities taking part in a negotiation and the protocol used to exchange filters is in [PROTO], which the reader should be familiar with. But we briefly summarize what is needed here. Readers who start to feel lost in the detail may like to look at the example in section 4.X. The filter negotiation steps are:

1) Advertisement. In the first step, a "producer" issues an "advertisement" which contains a filter, which we refer to here as the "ad filter".

2) Overlap comparison. A consumer looking for producers has a "template filter" which it compares to ad filters to determine if they are interesting to it. This operation produces a candidate proposal. We refer to this as an "overlap comparison" since the candidate proposal roughly denotes gidos that would match both template and ad filters. However, it should be stressed that the result is not exactly an overlap, and the operation is not commutative—the term is suggestive rather than precise.

3) Application level proposal check. After the overlap operation, an application may choose to apply additional restrictions to the resulting proposal, or decide not to make a proposal at all.

4) Proposal. If a consumer decides to try and contract for services with a producer, the consumer sends a "proposal filter" to the producer.

5) Producer verification. The producer verifies that the consumer's proposal filter is in fact a valid specialization of its original advertisement filter.

6) Gido delivery. Gidos flow either from producer to consumer, or vice versa depending on the case. Gidos must match the verified proposal filter.

4.2 Ad Filters

A variety of special restrictions apply to ad filters. Firstly, an ad filter must contain exactly one fragment clause (versus a general filter which might contain more than one) and may not contain a Permit clause. The rationale for this is that a producer should have a sufficiently clear idea of the layout of gidos that it will produce that it does not need to use multiple fragments with an uncertain relation to one another in order to describe it's planned output.

The data expression modifiers in an ad have these meanings:

!: This means that the field is "Always available". The producer is advertising that any gido it issues under this capability will definitely contain this field, and that if for some reason the field is not available, the gido will not be sent.

?: This means that the field might or might not be present in a gido sent under a contract based on this ad. If the field is not available, it shouldn't be sent, but the rest of the gido can be.

-: This field may not be negotiated about in the sense of providing a different data expression than the one in the ad.

+: This field may be negotiated about in the sense of providing a different data expression than the one in the ad.

In ad filter data fields, the name field should be left empty. Consumers should propose names rather than producers.

Finally, the producer is free to suggest any legal data expression in an ad. Generally, a producer will want to divide up the possible data values into sets which are convenient for it to package together.

4.3 Template Filters

Unlike ad filters, template filters may use a Permit clause, and may contain multiple fragments.

The data expression modifiers have the following meaning in a template:

!: This means that the field is "Required". The consumer cannot function without the presence of this field.

?: This means that the field might or might not be present in a gido sent under a contract based on this ad. If the field is not available, the field shouldn't be sent, but the rest of the gido still can be.

-/+: This field is not meaningful in the template. Template writers should supply one of the two legal values, but implementations should ignore which is supplied.

Templates may contain variable names for data fields.

The template may supply data expressions for individual fields. However, each data expression should either be a wildcard ("*"), or be structured as a single option.

4.4 Overlap Comparison

The overlap comparison compares an ad to a template, and produces a candidate proposal.

The overlap operation should fail unless the clause and SID structure in the ad can be matched to that in the template, in the same way that a gido can be matched to a filter (ie matching each fragment in the template to some piece of the ad, possibly using the Permit expression in the template to recurse fragments down to match clauses deeper in the ad).

Assuming the overlap is successful, the candidate proposal filter should have the same structure as the ad, except that any portions of the ad filter tree not required to match to the template should be pruned away.

The overlap operation should not succeed unless all the data expressions required by the template can be matched. For each field to match, the following is required.

The !/? characters must match according to the following table.

| Ad | Template | Overlap result | Character in candidate proposal |
|----|----------|----------------|--------------------------------|
| !  | !        | Success        | !                              |
| !  | ?        | Success        | !                              |
| ?  | !        | Failure        |                                |
| ?  | ?        | Success        | ?                              |

Also, the core data expressions must match according to the following rules.

If the ad contains a – modifier, then, for the expressions to match, either A the ad expression and the template expression contain exactly the same set of values, or B the template expression is "*" in which case the overlap succeeds and the candidate proposal contains the same data expression as the ad. If neither A or B is met, then the overlap fails and no proposal is generated.

If the ad contains a + modifier, then, for the expressions to match, either C the template expression consists of values which are wholly contained in the options in the ad expression. In this case, the candidate proposal expression consists of the minimal set of options drawn from the ad that are required to cover all the cases in the template expression. Or D the template contains a "*" in which case the overlap succeeds and the candidate proposal expression contains the ad filter expression Or E the ad contains "*" in which case the overlap succeeds and the candidate proposal contains the template filter expression If none of C, D, or E applies, then the overlap fails. Finally, in a successful overlap, any variable names defined in the template filter are mapped into the appropriate places in the candidate proposal.

4.5 Application Level Proposal Modification

After a candidate proposal filter has been generated in the way described above (which will typically be implemented by a standard filter library, eg [API]), a consumer application is free to further modify the candidate proposal in certain limited ways:

The consumer may decide, on any basis whatsoever, not to issue a proposal after all.

If the consumer does decide to issue a proposal, it may prune from the candidate proposal filter any parts of the tree it wishes to.

If a data expression in the candidate proposal has a "*", the application is free to replace this with a single option explicit data expression.

If there is an explicit multi-option data expression in the candidate proposal, an application is free to delete one or more of the options. It must leave at least one option, and it may not alter any options, or add any options.

Consumer applications must not alter proposal filters in any other way before sending them to producers.

We anticipate that usually applications will confine themselves to simply deciding whether or not to send the candidate proposal. The other options are probably usually better handled by altering the template filter.

4.6 Proposal and Proposal Verification.

The consumer now sends its proposal to the producer. The producer should verify that the proposal is a proper modification of its original ad.

This includes:

Testing that the proposal is a subtree of the original ad.

For each data expression in the proposal, testing that the modifier characters have not been changed in any way from the ad.

(Names may have been added and this is allowed).

If there was "*" in the ad filter data expression, then the proposal data expression should contain either * or an explicit single option data expression.

If there was an explicit multi-option data expression in the ad, then the proposal must contain a subset of those options, with at least one option present.

4.7 Gido Delivery.

Gidos may now flow. No gidos should be sent which do not match the proposal filter.

4.8 Example Negotiation

For the reader completely lost by the above detailed description, we now give an example filter negotiation sequence which may help to tie everything together.

[Author's note: the following gidos and filters have not been validated and may contain minor typos].

A snort-based gido producer (Event generator/E-box) might advertise the following:

```
(Filter
    (Fragment
        (ByMeansOf
            (Attack
                (When
                    (Time "!+::*")
                )
                (AttackSpecifics
                    (Attack-ID "!-::{{0x00000005}}","!+::*")
                    (AttackNickname "!-::*")
                )
                (Initiator
                    (IPV4Address "!+::*")
                    (FQHostName "?-::*")
                    (TCPSourcePort "!-::*")
                )
                (Target
                    (IPV4Address "!+::{{10.0.0.1,10.0.0.2},
{10.0.0.3,10.0.0.4},10.0.1.0/8}")
                    (FQHostName "?-::*")
                    (TCPDestinationPort "!+::*")
                )
                (Observer
                    (ProcessName "!-::{{'snort'}}")
                    (HostName "!-::{{'heracles'}}")
                )
            )
```

```
                (SendMessage
                    (When
                        (Time "!-::*")
                    )
                    (Initiator
                        (IPV4Address "!-::*")
                        (FQHostName "?-::*")
                        (TCPSourcePort "!-::*")
                    )
                    (Target
                        (IPV4Address "!-::*)
                        (FQHostName "?-::*")
                        (TCPDestinationPort "!-::*")
                    )
                    (Observer
                        (ProcessName "!-::{{'snort'}}")
                        (HostName "?-::{{'heracles'}}")
                    )
                    (Message
                        (TransportProtocol "?+::{{'tcp'}}")
                        (IPV4ServiceType "?+::*")
                        (IPV4Identifier "?+::*")
                        (IPV4TTL "?+::*")
                        (TCPSequenceNumber "?+::*")
                        (TCPAckNumber "?+::*")
                        (TCPWindow "?+::*")
                        (TCPFlags "?+::*");
                        (TCPMSS "?+::*");
                    )
                )
            )
        )
)
```

A consumer (A-box) might be looking for ads matching the following template:

```
(Filter
    (Fragment
                (Attack
                    (When
                        (Time "!+::*")
                    )
                    (AttackSpecifics
                        (Attack-ID "!+::{{0x00000005}}",
"!+::{{0x00000000,0x00000001}}")
                        (AttackNickname "?+::*")
                    )
                    (Initiator
                        (IPV4Address "!+::*")
                        (TCPSourcePort "?+::*")
                    )
                    (Target
                        (IPV4Address "!+::{{10.0.0.1,10.0.1.17,10.0.1.18}})
                        (TCPDestinationPort "!+::*")
                    )
                    (Observer
                        (ProcessName "?+::*")
                        (HostName "?+::*")
                        (IPv4Address "?+::*")
                                )
                )
            (Permit 'ByMeansOf', 'And', 'HelpedCause')
)
```

This will match the ad, and should result in the following candidate proposal:

```
(Filter
    (Fragment
        (ByMeansOf
            (Attack
                (When
                    (Time "!+::*")
                )
                (AttackSpecifics
                    (Attack-ID "!-::{{0x00000005}}",
"!+::{{0x00000000,0x00000001}}")
                    (AttackNickname "!-::*")
                )
                (Initiator
                    (IPV4Address "!+::*")
                    (TCPSourcePort "!-::*")
                )
                (Target
                    (IPV4Address "!+::{{10.0.0.1,10.0.0.2},
                        10.0.1.0/8})
                    (TCPDestinationport "!+::*")
                )
                (Observer
                    (ProcessName "!-::{{'snort'}}")
                    (HostName "!-::{{'heracles'}}")
                )
            )
        )
    )
)
```

Note how the structure of the candidate proposal is basically a subtree of the ad.

Assuming this proposal is accepted by the consumer application and sent, it should verify with the producer. An example gido which then might be sent is:

```
(ByMeansOf
    (Attack
        (When
            (Time "10/04-16:21:48")
        )
        (AttackSpecifics
            (Attack-ID 0x00000005, 0x0000000)
            (AttackNickname "NMAP TCP ping")
        )
        (Initiator
            (IPV4Address 10.0.0.2)
            (TCPSourcePort 52716)
        )
        (Target
            (IPV4Address 10.0.0.5)
            (TCPDestinationPort 39241)
        )
        (Observer
            (ProcessName 'snort')
            (HostName 'heracles')
        )
    )
)
```

5. Encoding the Filter Body.

A filter is encoded in exactly the same way as a gido, except that all data expressions are encoded as CISL strings, regardless of the type that would normally be associated with that particular SID.

6. Acknowledgements

This document was shaped by extensive discussions with Joey McAlemey of Silicon Defense. The rest of the IDIAN team also made comments which were helpful (Mark Heckman and Karl Levitt at UC Davis; Lee Benzinger, Rich Feiertag, Sue Rho, and Steve Wu at Network Associates).

REFERENCES

[API] Staniford-Chen, S. A Perl API for IDIAN filtering and negotiation.

[CISL] Tung, B. (Ed) A Common Intrusion Specification Language (CISL). http://gost.isi.edu/cidf/drafts/language.txt

[IDIAN] Feiertag, R. et al Intrusion Detection Inter-component Adaptive Negotiation. Proceedings of the 2nd International Workshop on Recent Advances in Intrusion Detection (RAID 99), West Lafayette, Ind., September 1999.

[PROTO] Peticolas, D. et al. IDIAN Protocol Design. Version 1.

A. SID Listing

This documents SIDS which are used in filters, but do not appear in the CISL specification. The following is machine parseable data for use by filter libraries.

Name: Filter

Code: 99999991

Type: conjunction

Filter: yes

Description: The 'Filter' SID is used only in filters. It is used to specify a single filter May Contain:
  The following are filter SIDs:
  Fragment Permit Name: Fragment Code: 99999992

Type: conjunction

Filter: yes

Description: A piece of a filter used to match a particular clause in a gido

May Contain:
  The following are referent SIDs:
  ReferAs ReferTo
  The ByMeansOf SID may contain any number of sentences headed
  by any of the following SIDs:
  And HelpedCause ByMeansOf
  HTTPPost HTTPGet OpenApplicationSession CloseApplicationSession
  Login OpenFTP Request Require Allow Forbid Attack
  Copy Move Delete Execute Suspend Resume Terminate
  Reboot Shutdown Boot SendMessage TCPConnect SendMail
  AcquireProxy ReleaseProxy AuditAccount AuditMessage BlockMessage TraceMessage Name: Permit Code: 99999993

Type: arraychar

Filter: yes

Description: Followed by string which contains a white space separated list of SIDS which may be recursed through at the top of a gido being matched. SIDS are listed via their names, not codes.

IDIAN Protocol Design Version 1

IDIAN Protocol Design

Version 1

Draft 0.91

Mar. 14, 2000

Dave Peticolas

Mark Heckman

—UC Davis—

Stuart Staniford-Chen

—Silicon Defense—

Rich Feiertag

Lee Benzinger

Sue Rho

—NAI Labs—

0. INTRODUCTION

This document defines the IDIAN protocol. IDIAN stands for Intrusion Detection Inter-component Adaptive Negotiation. This document is divided into 9 sections including this introduction (Section 0). Section 1 identifies other documents which are referenced and used by this specification. Section 2 defines the system model and describes the purpose of the protocol in the model. Section 3 defines the concepts used in the protocol. Section 4 defines the system and protocol states. Section 5 describes the protocol messages at a high level. Section 6 defines the operation of a component using the protocol and Section 7 defines the network formats of messages. Section 8 contains the bibliography.

1. OTHER SPECIFICATIONS USED

The IDIAN protocol uses the CISL language as part of its communication mechanism. The CISL language is defined in 'A Common Intrusion Specification Language (CISL)', hereafter referenced as [CISL].

This document uses the 'GIDO Filtering Requirements and Design' document (hereafter referenced as [GFRD]) as part of the specification.

2. SYSTEM MODEL AND PROTOCOL PURPOSE

The IDIAN protocol uses a system model in which intrusion detection components are operating over a network. Certain components have capabilities which they may use to provide intrusion detection information. Other components have the ability to consume (use) this information. Components have finite resources, some of which are used in providing or consuming intrusion detection information.

All components in the IDS communicate information about ID activity using Generalized Intrusion Detection Objects (GIDOs). GIDOs are defined in [CISL]. GIDOs are also used to command components to take specific actions, such as destroying a network connection.

The purpose of the IDIAN protocol is to allow components to:

1. Discover the capabilities of other components.

2. Negotiate for the use of those capabilities.

3. Intelligently manage the use of resources by components.

4. Dynamically adjust the use of capabilities, perhaps in order to manage resources or respond to changes in the environment.

The primary function of the IDIAN protocol is to define the notion of a negotiation—a sequence of message exchanges between two components for the purpose of allowing one of the components to acquire the use of the capabilities of the other component.

2.1 Transport Issues

To function properly, the protocol presented in this document requires a transport layer which provides reliable, in-order message delivery, such as the TCP protocol.

2.2 Security Issues

The protocol presented in this document is not 'secure', in the sense of providing built-in mechanisms for security such as authentication, privacy, non-repudiation, etc. For the protocol to be considered secure, either:

1. The protocol must be enhanced to provide security mechanisms directly.

2. The underlying low-level communications framework must provide security mechanisms.

3. A combination of the above.

3. PROTOCOL CONCEPTS

This section defines several different terms used in the protocol definition.

3.1 Component Roles

During negotiation, each component plays the role of 'producer' or 'consumer'. During a single negotiation, a component will play exactly one role with respect to another component in the negotiation. However, the same component may play different roles in different negotiations. Also, a component may play different roles in a hierarchical negotiation. The proper behavior of a component during a negotiation is determined by its role.

The roles of 'producer' and 'consumer' refer to the fact that the producer will, as a result of the negotiation, provide functionality to the consumer. The roles do not imply which component may send GIDOs to the other. In general, GIDOs may be sent by either the producer or the consumer to the other component, subject to the requirements explained in the rest of this document.

A negotiation may set up a relationship between two components (see Section 3.3 below). The roles the components played during a negotiation are carried into the relationship created by the negotiation, i.e., the component that was the consumer during the negotiation is also the consumer for that particular relationship.

3.2 Capability

A capability is a functionality which one component provides on behalf of other components, which are said to use the capability. Examples of capabilities include:

+ Detecting a particular kind of attack.

+ Logging specific information about user activity.

+ Preventing certain packet types from entering a network.

In the system model, all capabilities are supplied or accessed using GIDOs. In the first two examples, attack reports and user activity logs would be sent in the form of GIDOs. In the last example, the command to filter out a particular type of packet would be issued as a GIDO.

A capability has a 'direction', indicating which components may send or receive GIDOs in the process of providing or using the capability. A capability's direction is one of the following:

Forward: The component providing the capability sends GIDOs to component(s) using the capability. For example, the capability of detecting and reporting an attack is a Forward capability.

Reverse: The component(s) using the capability send GIDOs to the component providing the capability.

For example, the capability of filtering packets on command is a Reverse capability.

Every capability is either Forward or Reverse, but not both, i.e., the GIDOs associated with a capability may only be sent in one direction.

Thus, a capability may be characterized as the combination of:

1. The set of GIDOs which a component may send or receive as part of providing that capability.

2. The direction in which the GIDOs may flow, either Forward or Reverse.

The [GRFD] defines a 'GIDO Filter', a syntactic construct for specifying sets of GIDOs. The IDIAN protocol uses GIDO filters to specify GIDO sets and, consequently, to specify capabilities. Hereafter, a capability refers to a GIDO filter and a direction.

Capabilities are identified using positive numeric IDs.

3.3 Contract

A contract is a relationship between a producer and a consumer (the 'partners' to the contract), which, under certain conditions, obligates the producer to supply a capability to the consumer.

A contract must contain the following information:

+ The capability which is being provided.

+ The producer and consumer components in the contract.

Contracts are identified using positive numeric IDs.

A contract is always in one of three states:

Pending: The contract has been proposed, but not accepted. See section 5.3 below.

Active: The contract has been accepted and the producer is obliged to provide the capability contained in the contract.

Inactive: The contract has been accepted, but the producer should not provide the capability contained in the contract.

In addition, a contract is a Forward contract if the capability being provided is Forward, and a Reverse contract if the capability being provided is Reverse. Thus, every contract is either Forward or Reverse, but not both (see Section 3.2).

3.4 Contract Database

A contract database is a set of contracts. Every component has a contract database containing all the contracts to which it is a partner.

Each contract in the database must have a unique ID with respect to the set of contracts with the same partner. There is never a contract with ID 0.

3.5 Capability Database

A capability database associates capabilities with the components which can provide them. Each component has a database containing its own capabilities and, possibly, those of other components.

3.6 Load

Load is a measure of the resources being used by a component. A 'load vector' is a vector of values which measure load in different areas, e.g., CPU time, network bandwidth, etc. Load can be measured both for a component as a whole and for individual contracts.

A 'component load vector' is a load vector with one or more of the following values:

GIDO Count—Total number of GIDOs sent/received by the component over all contracts.

Total Contracts—Total number of contracts in the component's contract database.

Active Contracts—Number of Active contracts the component has.

GIDO Size—Total size in octets of all GIDOs sent/received by the component.

CPU Time—Total CPU time in microseconds used by the component.

A contract load vector is a load vector associated with a particular contract and component. A contract load vector contains one or more of the following values:

GIDO Count—Total number of GIDOs sent/received by the component for the contract.

GIDO Size—Total size in octets of all GIDOs sent/received by the component for the contract.

CPU Time—Total CPU time in microseconds used by the component in supplying the contract.

Component (resp. contract) load vectors reported by a component are an unweighted average over a set of component (contract) load vectors.

The set of vectors used to calculate the average is determined by two integer values:

LoadDelta: Each load vector in the set is a measurement over LoadDelta seconds.

LoadCount: Each set contains the most recent LoadCount vectors which have been measured. If fewer than LoadCount vectors have been measured, then the set contains all the measurements taken so far.

LoadDelta and LoadCount are fixed at 30 and 5 respectively.

Some vector quantities may be difficult or impossible to measure. For example, a component may not be able to distinguish CPU time used in processing two different contracts. If a component is unable to measure a particular load value, it simply omits that value from the vector when sending a Load message.

3.7 Load Limits

A load limit specifies the maximum amount of load that a component can be reasonably expected to operate under without problems. A load limit has the same structure and components as a component load vector. However, the quantities in a load limit are maximum values, not measurements. Also, the quantities in a load limit are always with respect to the entire component, not a particular contract.

A producer component may send a load limit to a consumer component. How the consumer uses that information is not specified by this protocol.

The producer may omit some of the components of the vector if their maximum values are not available.

4. SYSTEM AND PROTOCOL STATE

The state of the IDS is given by the vector of states of each component in the system. The state of an individual component is given by its capability and contract databases.

5. PROTOCOL MESSAGES

This section describes each type of message supported by the protocol, including the message's purpose and content. The details of message network formats are given in Section 7.

Each message consists of a header and a body. The fields of the header are fixed and are described in Section 5.1. The body of the message depends on the type of message. The description of each message below includes the following fields:

Sender—the type (producer or consumer) of the sender, or 'any'.

Receiver—the type (producer or consumer) of the receiver, or 'any'.

Body—the information in the body of the message

Effect—the effect on the message on the sender and receiver

Restrictions—conditions that the contents of the message must satisfy

5.1 Message Header

Each message in the IDIAN protocol is sent with a header containing the following information:

1. Protocol version number. This is 1 for the version described by this document.

2. Message type. This is a numeric ID identifying the type of message.

3. Contract ID. The ID of the contract the message is referring to, or 0 if the message is not associated with a specific contract.

4. Capability ID. The ID of the capability the message is referring to, or 0 if the message is not associated with a specific capability.

5. Component ID. The ID of the component sending the message.

6. Component ID. The ID of the component the message is destined for.

7. The length of the message body.

5.2 GIDO

A GIDO message is an IDIAN message which contain a GIDO and identifies the contract and capability under which the GIDO is being sent. A GIDO message must have a valid contract ID in the header, identifying the contract which the GIDO is being sent in regards to. Components may send or receive GIDO messages at any time, subject to the restrictions below.

Sender: Any (See Restrictions)

Receiver: Any (See Restrictions)

Body: GIDO—the GIDO being sent

Effect: The sender and receiver update their system and contract load information. The receiver may perform contract- and GIDO-specific processing.

If the receiver does not have a contract with the specified contract number and sender, the receiver must reply with an Error message with a code of No Such Contract.

Restrictions: The sender must have an Active contract with the ID number specified in the message header. The receiver must be the partner to that contract. The GIDO must match the filter associated with the contract. The capability ID in the header must refer to the corresponding capability of the sender.

See [GFRD] for details of filter matching.

If the corresponding contract is Forward, the sender must be the producer and the receiver must be the consumer. If the corresponding contract is Reverse, the sender must be the consumer and the receiver must be the producer.

5.3 Proposal

A proposal message is sent from a consumer to a producer in order to establish a new contract.

Sender: Consumer

Receiver: Producer

Body: Status—Either Active or Inactive. This determines the status of the new contract, should it be accepted. Filter—The set of GIDOs being proposed. The direction of the contract is implied by the capability ID given in the header.

Effect: The sender adds the contract to its database with a status of Pending.

If the receiver already has a contract with the sender with the same ID, the receiver must respond with an Error message with a status of Contract Already Exists.

Otherwise, the receiver must respond to the message with either an Accept or Reject message.

Restrictions: The contract ID may not be 0. The sender must not have a contract with the same ID and partner. The sender must supply the specific capability ID for the capability it is requesting. The filter in the message must overlap with the filter in the capability [see GRFD].

5.4 Accept

An accept message is sent from a producer to a consumer in response to a proposal message. An accept message signifies that the producer has accepted the contract and is awaiting a seal message.

Sender: Producer

Receiver: Consumer

Body: empty

Effect: The sender adds the contract to its database with a status of Pending.

The receiver changes the status of the corresponding pending contract to the status specified in the proposal.

Restrictions: The contract ID must match the ID given in the proposal. The capability ID must match that given in the proposal.

5.5 Reject

A reject message is sent from a producer to a consumer in response to a proposal message. A reject message signifies that the producer has rejected the contract and supplies a reason for the rejection.

Sender: Producer

Receiver: Consumer

Body: A code signifying the reason for the rejection. Possible reasons are:

No Such Capability: The capability requested does not exist.

Mismatch: The filter in the proposal cannot be matched with the filter of the capability requested.

Not Allowed: The consumer is not allowed to use the services specified in the contract.

Effect: The receiver discards the corresponding pending contract in its contract database.

Restrictions: The contract ID must match the ID given in the proposal. The capability ID must match that given in the proposal.

5.6 Seal

A seal message is sent from a consumer to a producer in response to an accept message. A seal message signifies that the consumer has received the accept and has added the contract to it's database with the proposed status.

Sender: Producer

Receiver: Consumer

Body: empty

Effect: The receiver changes the status of the corresponding pending contract to the status specified in the proposal. If the status is Active, the receiver must begin providing the service specified in the contract.

Restrictions: The contract ID must match the ID given in the proposal. The capability ID must match that given in the proposal.

5.7 Change Status

A change status message is sent from a consumer to a producer to change the status of an existing contract. A change status message may be sent at any time, subject to the restrictions below.

Sender: Consumer

Receiver: Producer

Body: A status code which must be one of:

Active: Switch the contract status to Active

Inactive: Switch the contract status to Inactive

Effect: If the receiver has a contract with the sender with the ID given in the message, that contract's status is switched to that given in the message body. Otherwise, the receiver responds with an error message with a No Such Contract code (Section 5.10). If there is no error, the receiver must reply with a Status Changed message (Section 5.8).

The sender switches the corresponding contract in the sender's database to the status given in the message.

Restrictions: There must be a contract with the given ID and with the receiver as partner in the sender's contract database. The capability ID must refer to the capability used in the contract.

5.8 Status Changed

A status changed message is sent from a producer to a consumer to acknowledge the change in status of an existing contract.

Sender: Producer

Receiver: Consumer

Body: A status code which must be one of:

Active: Switch the contract status to Active

Inactive: Switch the contract status to Inactive

Effect: The receiver switches the corresponding contract in the receiver's database to the status in the message.

Restrictions: There must be a contract with the given ID and with the receiver as partner in the sender's contract database. The capability ID must refer to the capability used in the contract. The status code must be identical to that given in the Change Status message.

5.9 Terminate Contract

A terminate contract message is sent from one contract partner to another to terminate a contract between them. The sender supplies a reason for termination in the body of the message. A terminate contract message may be sent at any time, subject to the restrictions below.

Sender: Any

Receiver: Any

Body: A code identifying the reason for termination. The reason must be one of the following:

Consumer Termination: Used by consumers. A consumer may terminate a contract at any time Cannot Supply: Used by producers. Indicates that the producer has lost the capability in the contract.

Not Allowed: Used by producers. Indicates that the consumer has lost the authority to use the capability.

Effect: If the receiver has a contract with the sender with the ID given in the message, that contract is removed from the database. Otherwise, the receiver responds with an error message with a No Such Contract code (Section 5.10).

The sender deletes the corresponding contract from the sender's database.

Restrictions: There must be a contract with the given ID and with the receiver as partner in the sender's contract database. The capability ID must refer to the capability used in the contract.

Consumers must use the Consumer Termination reason. Producers must the either the Cannot Supply or Not Allowed reason as appropriate. A producer may only terminate a contract for those two reasons.

5.10 Error

An error message is sent as a response to certain messages to indicate an error condition.

Sender: Any

Receiver: Any

Body: A code identifying the error condition. The condition must be one of the following:

No Such Contract: The contract specified does not exist. No Such Capability: The capability specified does not exist.

Contract Already Exists: The contract being proposed already exists.

Effect: not specified

Restrictions: For No Such Contract messages, the contract ID must be the same as in the message the error is responding to, i.e., the invalid contract number. For No Such Contract messages, the capability ID must be that used by the contract.

For No Such Capability messages, the capability ID must be the same as in the message the error is responding to, i.e., the invalid capability number. For No Such Capability messages, the contract ID must be 0.

For Contract Already Exists messages, the contract ID must be the same as in the offending proposal message. The Capability ID must be that used by the contract.

5.11 Advertisement

An advertisement is sent by a producer to communicate the capabilities which it can provide.

Sender: Producer

Receiver: Any

Body: Either a filter and direction identifying a capability of the producer, or an empty body.

Effect: The receiver may elect to update its capability database with the new information. If the receiver is already storing capability information for the sender, then the receiver must update its capability database with the new information.

Restrictions: The contract ID in the message must be 0. The capability ID must be non-zero and, if the body is non-empty, must correspond with a capability of the sender.

If the body length is zero, the message is advertising the removal of the specified capability. Otherwise, the body must contain a filter and the message is advertising the addition (or change) of an existing capability.

5.12 Ad Request

An ad request is sent from a consumer to a producer to obtain one or more advertisements about the producer's capabilities.

Sender: Consumer

Receiver: Producer

Body: empty

Effect: If the capability ID is 0, the receiver must send advertisement messages to the producer that contain all the capabilities of the receiver.

If the capability ID is non-zero, the receiver must send an advertisement to the producer with the specified capability, or an Error message with a code of No Such Capability.

Restrictions: The contract ID in the message must be 0.

The capability ID may be either 0 or non-zero.

5.13 Load

A load message is sent by a producer to a consumer to communicate its current system or contract load.

Sender: Producer

Receiver: Consumer

Body: Either a component load vector or a contract load vector.

Effect: not specified

Restrictions: A message containing a component load vector must have a contract ID of 0. A message containing a contract load vector must have a contract ID of the corresponding contract.

If the contract ID is non-zero, the capability ID must refer to the capability used by the contract.

Otherwise, the capability ID must be 0.

5.14 Load Request

A load request message is sent from a consumer to a producer to obtain either component or contract load information.

Sender: Consumer

Receiver: Producer

Body: empty

Effect: The receiver must respond with the appropriate load message or, if the requested contract doesn't exist, an error message with No Such Contract code (Section 5.10).

Restrictions: A request for a component load vector is indicated by using a contract ID of 0. A request for a contract load must have a contract ID that matches an existing contract in the sender's database with the receiver as partner.

If the contract ID is non-zero, the capability ID must refer to the capability used by the contract.

Otherwise, the capability ID must be 0.

5.15 Load Limit

A load limit message is sent by a producer to a consumer to communicate the producer's current load limits.

Sender: Producer

Receiver: Consumer

Body: A load limit (Section 3.7).

Effect: not specified

Restrictions: The contract and capability IDs must be 0.

5.16 Load Limit Request

A load limit request message is sent from a consumer to a producer to obtain load limit information.

Sender: Consumer

Receiver: Producer

Body: empty

Effect: The receiver must respond with a load limit message.

Restrictions: The contract and capability IDs must be 0.

6. PROTOCOL OPERATION

This describes the operation of a component using the protocol.

6.1 Sending Messages

During operation, a component must supply any GIDOs matching the filter of any contracts to which it is a producing partner. See [GFRD] for details on matching GIDOs with filters.

During operation, a component may send any of the messages in Section 5 subject to the following rules:

+ The sender and receiver of the message must be allowed by the Sender and Receiver specified in Section 5.

+ The restrictions specified in Section 5 must be followed.

+ Accept and Reject messages may only be sent in response to a proposal.

+ An Error message may only be sent in response to a GIDO, Proposal, Change Status, Terminate Contract, or Load Request message.

+ An Advertisement may only be sent when a component comes online after being offline, or when its capabilities change.

+ A Load message may only be sent in response to a Load Request Message.

6.2 Receiving Messages

If a component receives a message it is not expecting (i.e., an Accept message when no proposal has been sent), then the message is ignored, unless it would result in the transmission of an Error message as specified in Sections 5 and 6.

6.3 Component State

The state of a component is given by its component and contract databases. A component that comes on-line for the first time should have an empty contract database.

A component may only change its state in the following ways:

+ Upon reception or transmission of a message, a component must modify its state per the descriptions of Section 5.

+ When a component's capabilities change, its capability database entry for itself must be changed to reflect the change in capabilities.

+ A component that has a pending contract may remove that contract if a response (Accept, Reject, Error) is not received within a time-out period. This period must be greater than 30 seconds.

7. PROTOCOL MESSAGES—NETWORK FORMAT

This section describes the network format of each type of message supported by the protocol. The details of a message's purpose and semantic content are given in Section 5.

Each message is consists of a message header followed by a body. The header has a fixed length and field structure and is described in Section 7.1. The length of the body is variable and the format depends on the type of message.

For each type of message, there is a subsection describing the format of the body. In all sections of this document, an 'octet' refers to an 8-bit byte.

7.1 Message Header

The header is a 32 octet structure containing the following fields, each stored in network byte order:

1. 2 octets—Protocol version number
2. 2 octets—Message type
3. 4 octets—Contract ID
4. 4 octets—Capability ID
5. 8 octets—Sender Component ID
6. 8 octets—Recipient Component ID
7. 4 octets—Length of the message body The message types are as follows:

GIDO=0

Proposal=1

Accept=2

Reject=3

Seal=4

Change Status=5

Terminate Contract=6

Error=7

Advertisement=8

Ad Request=9

Load=10

Load Request=11

Load Limit=12

Load Limit Request=13

A Component ID is an ASCII string with 8 characters.

7.2 GIDO

1. A GIDO encoded per [CISL].

7.3 Proposal 1. 4 octets—Contract Status code
   Active=0
   Inactive=1

2. A GIDO filter encoded per [GFRD].

7.4 Accept

Accept messages have no body.

7.5 Reject 1. 4 octets—Rejection code

No Such Capability=0

Mismatch=1

Not Allowed=2

7.6 Seal

Seal messages have no body.

7.7 Change Status 1. 4 octets—Contract Status code

Active=0

Inactive=1

7.7 Status Changed 1. 4 octets—Contract Status code

Active=0

Inactive=1

7.9 Terminate Contract 1. 4 octets—Termination code

Consumer Termination=0

Cannot Supply=1

Not Allowed=2

7.10 Error 1. 4 octets—Error code

No Such Contract=0

No Such Capability=1

Contract Already Exists=2

7.11 Advertisement
Either 1. 4 octets—Direction code

Forward=0

Reverse=1

2. A GIDO filter encoded per [GFRD].

or

1. An empty body.

7.12 Ad Request
Ad Requests have no body.

7.13 Load
The body of a Load message contains a vector as described in Section 5.10. The length of the vector depends on the type of load being sent (component or contract load) and on the measuring capabilities of the component. Thus, the load body must encode:

1. The number of elements in the vector.

2. The type of each element, i.e., CPU time, GIDO count, etc.

3. The value of each element.
The encoding is:

1. 2 octets—the number of elements in the vector

2. For each element, encode:

2.1 2 octets—The type of element

GIDO Count=0

Total Contracts=1

Active Contracts=2

GIDO Size=3

CPU Time=4

2.2 4 octets—The value of the element 7.14 Load Request
Load Request messages have no body.

7.15 Load Limit
The body of a Load Limit message has the same format as a component Load message (Section 7.11).

7.16 Load Limit Request
Load Limit Request messages have no body.

8. REFERENCES

[CISL] Tung, B. (Ed) A Common Intrusion Specification Language (CISL). http://gost.isi.edu/cidf/drafts/language.txt

[GFRD] Staniford-Chen, S. GIDO Filtering Requirements and Design.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method implemented using a computer for dynamic adaptation of a system in accordance with a contract with criteria associated therewith, comprising:

governing a security-related interaction between a plurality of components of the system utilizing the criteria of the contract, the components including an intrusion detection module which is subject to the governing;

determining whether the security-related interaction between the components of the system meets the criteria of the contract; and adapting the security-related interaction between the components of the system upon the criteria of the contract not being met;

wherein the contract is created by advertising a capability to a control component which handles contract negotiations, receiving a proposed contract based on the capability, accepting the proposed contract, receiving a seal message, receiving and storing a fallback proposed contract, and if replacement of the proposed contract is required, replacing the proposed contract with the fallback proposed contract;

wherein the proposed contract is selected from a predetermined set;

wherein replacement of the proposed contract is required when the interaction governed by the proposed contract no longer meets criteria of a cost model;

wherein the system includes the intrusion detection module and triggers a reaction based on the security-related interaction.

2. The method as recited in claim 1, wherein the security-related interaction between the components of the system is adapted by adjusting the contract.

3. The method as recited in claim 2, wherein the contract is adjusted by a method selected from the group consisting of deactivation of the contract, modification of the contract, deletion of the contract, and activation of a different contract.

4. The method as recited in claim 1, wherein the criteria of the contract include cost model criteria.

5. The method as recited in claim 4, wherein the cost model criteria is based on resource utilization.

6. The method as recited in claim 4, wherein the cost model criteria is based on performance.

7. The method as recited in claim 4, wherein the cost model criteria is based on service provisioning.

8. The method as recited in claim 1, wherein the components include the intrusion detection module and an analysis module.

9. The method as recited in claim 1, wherein the control component selects the contract from the predetermined set of contracts.

10. The method as recited in claim 1, wherein the interaction is prohibited if the proposed contract is not accepted.

11. The method as recited in claim 1, wherein another seal message is received from the control component for completing the fallback proposed contract.

12. The method as recited in claim 11, wherein the fallback proposed contract is stored, but not activated, before the completion, for use in case the replacement is required.

13. A computer program product stored on a computer-readable medium for dynamic adaptation of a system in accordance with a contract with criteria associated therewith, comprising:

(a) computer code for governing a security-related interaction between a plurality of components of the system utilizing the criteria of the contract, the components including an intrusion detection module which is subject to the governing;

(b) computer code for determining whether the security-related interaction between the components of the system meets the criteria of the contract; and (c) computer code for adapting the security-related interaction between the components of the system upon the criteria of the contract not being met;

wherein the contract is created by advertising a capability to a control component which handles contract negotiations, receiving a proposed contract based on the capability, accepting the proposed contract, receiving a seal message, receiving and storing a fallback proposed contract, and if replacement of the proposed contract is required, replacing the proposed contract with the fallback proposed contract;

wherein the proposed contract is selected from a predetermined set;

wherein replacement of the proposed contract is required when the interaction governed by the proposed contract no longer meets criteria of a cost model;

wherein the system includes the intrusion detection module and triggers a reaction based on the security-related interaction.

14. The computer program product as recited in claim 13, wherein the security-related interaction between the components of the system is adapted by adjusting the contract.

15. The computer program product as recited in claim 14, wherein the contract is adjusted by a method selected from the group consisting of deactivation of the contract, modification of the contract, deletion of the contract, and activation of a different contract.

16. The computer program product as recited in claim 13, wherein the criteria of the contract includes cost model criteria.

17. The computer program product as recited in claim 16, wherein the cost model criteria is based on resource utilization.

18. The computer program product as recited in claim 16, wherein the cost model criteria is based on performance.

19. The computer program product as recited in claim 16, wherein the cost model criteria is based on service provisioning.

20. The computer program product as recited in claim 13, wherein the components include the intrusion detection module and an analysis module.

21. An apparatus stored on a computer-readable medium for dynamic adaptation of a system in accordance with a contract with criteria associated therewith, comprising:

a module for:

(a) governing a security-related interaction between a plurality of components of the system utilizing the criteria of the contract, the components including an intrusion detection module which is subject to the governing;

(b) determining whether the security-related interaction between the components of the system meets the criteria of the contract; and (c) adapting the security-related interaction between the components of the system upon the criteria of the contract not being met;

wherein the contract is created by advertising a capability to a control component which handles contract negotiations, receiving a proposed contract based on the capability, accepting the proposed contract receiving a seal message, receiving and storing a fallback proposed contract, and if replacement of the proposed contract is required, replacing the proposed contract with the fallback proposed contract;

wherein the proposed contract is selected from a predetermined set;

wherein replacement of the proposed contract is required when the interaction governed by the proposed contract no longer meets criteria of a cost model;

wherein the system includes the intrusion detection module and triggers a reaction based on the security-related interaction.

22. A method implemented using a computer for dynamic adaptation of a system in accordance with a contract with criteria associated therewith, comprising:

governing a security-related interaction between a plurality of components of the system utilizing the criteria of the contract, the components including a plurality of intrusion detection modules, and at least one firewall which are subject to the governing;

determining whether the security-related interaction between the components of the system meets the criteria of the contract utilizing an analysis module; and adapting the security-related interaction between the components of the system upon the criteria of the contract not being met utilizing the analysis module;

wherein the security-related interaction between the components of the system is adapted by adjusting the contract by a method selected from the group consisting of deactivation of the contract, modification of the contract, deletion of the contract, and activation of a different contract;

wherein the contract is created by advertising a capability to a control component which handles contract negotiations, receiving a proposed contract based on the capability, accepting the proposed contract receiving a seal message, receiving and storing a fallback proposed contract, and if replacement of the proposed contract is required, replacing the proposed contract with the fallback proposed contract;

wherein the proposed contract is selected from a predetermined set;

wherein replacement of the proposed contract is required when the interaction governed by the proposed contract no longer meets criteria of a cost model;

wherein the system includes the intrusion detection modules and triggers a reaction based on the security-related interaction.

23. The method as recited in claim 22, wherein the intrusion detection modules are adapted for communicating information to the analysis module for detecting intrusions.

24. The method as recited in claim 23, wherein information includes generalized intrusion detection objects.

* * * * *